US008713593B2

(12) United States Patent
Humphrey et al.

(10) Patent No.: US 8,713,593 B2
(45) Date of Patent: Apr. 29, 2014

(54) DETECTION SYSTEM AND METHOD FOR MOBILE DEVICE APPLICATION

(75) Inventors: Eric J. Humphrey, Brooklin, NY (US); Susan K. Rits, Redwood City, CA (US); Jonathan Boley, Lombard, IL (US); Oliver Masciarotte, San Francisco, CA (US)

(73) Assignee: Zazum, Inc., New York, NY (US)

( * ) Notice: Subject to any disclaimer, the term of this patent is extended or adjusted under 35 U.S.C. 154(b) by 21 days.

(21) Appl. No.: 13/409,021

(22) Filed: Feb. 29, 2012

(65) Prior Publication Data

US 2012/0216226 A1 Aug. 23, 2012

Related U.S. Application Data

(63) Continuation-in-part of application No. 12/932,620, filed on Feb. 28, 2011, now abandoned.

(60) Provisional application No. 61/309,370, filed on Mar. 1, 2010.

(51) Int. Cl.
*H04H 60/33* (2008.01)
*H04H 60/32* (2008.01)
*G06F 15/00* (2006.01)
*G10L 25/00* (2013.01)
*G10L 21/00* (2013.01)
*G10L 19/00* (2013.01)

(52) U.S. Cl.
USPC ...... 725/18; 725/9; 725/14; 725/19; 704/200; 704/270; 704/500

(58) Field of Classification Search
USPC .......................................... 725/18
See application file for complete search history.

(56) References Cited

U.S. PATENT DOCUMENTS

| 5,796,785 | A | 8/1998 | Spiero |
| 5,945,932 | A | 8/1999 | Smith et al. |
| 6,125,172 | A | 9/2000 | August et al. |
| 6,389,055 | B1 | 5/2002 | August et al. |
| 6,421,445 | B1 * | 7/2002 | Jensen et al. ............. 380/253 |
| 6,505,160 | B1 | 1/2003 | Levy et al. |
| 7,460,991 | B2 | 12/2008 | Jones et al. |
| 7,783,489 | B2 * | 8/2010 | Kenyon et al. ........... 704/270.1 |
| 7,908,133 | B2 * | 3/2011 | Neuhauser ................. 704/203 |
| 2003/0005430 | A1 * | 1/2003 | Kolessar ..................... 725/9 |

(Continued)

FOREIGN PATENT DOCUMENTS

| JP | 2002-232866 | 8/2002 |
| JP | 2003-046983 | 2/2003 |

(Continued)

*Primary Examiner* — Justin Shepard
(74) *Attorney, Agent, or Firm* — Weide & Miller, Ltd.

(57) ABSTRACT

A system and method for detecting a non-visual code using an application on a mobile device, where the application is capable of associating the non-visual code with at least one item contained in a transmitted presentation and connecting the mobile device to information about the item in a database associated with the transmitted presentation. The non-visual code may comprise a high frequency signal played alone or with another audio or video signal. A mobile device application executing on a processor of the mobile device performs signal processing on the audio signal of the presentation to extract the high frequency signal. Also contemplated is obtaining information about the visual content and presenting the information on the personal device.

10 Claims, 12 Drawing Sheets

(56) References Cited

U.S. PATENT DOCUMENTS

| | | |
|---|---|---|
| 2004/0078806 A1* | 4/2004 | Johnson et al. .................. 725/9 |
| 2005/0125820 A1* | 6/2005 | Nelson et al. .................. 725/18 |
| 2005/0177861 A1 | 8/2005 | Ma et al. |
| 2007/0274487 A1 | 11/2007 | Tsai |
| 2008/0052083 A1 | 2/2008 | Shalev et al. |
| 2008/0105110 A1* | 5/2008 | Pietrusko et al. ............... 84/615 |
| 2009/0186639 A1 | 7/2009 | Tsai |

FOREIGN PATENT DOCUMENTS

| | | |
|---|---|---|
| JP | 2004-234646 | 8/2004 |
| JP | 2006-085392 | 3/2006 |
| KR | 10-2006-0097187 | 9/2006 |
| WO | WO 2007-128394 | 11/2007 |

* cited by examiner

FIG. 5
FIG. 6

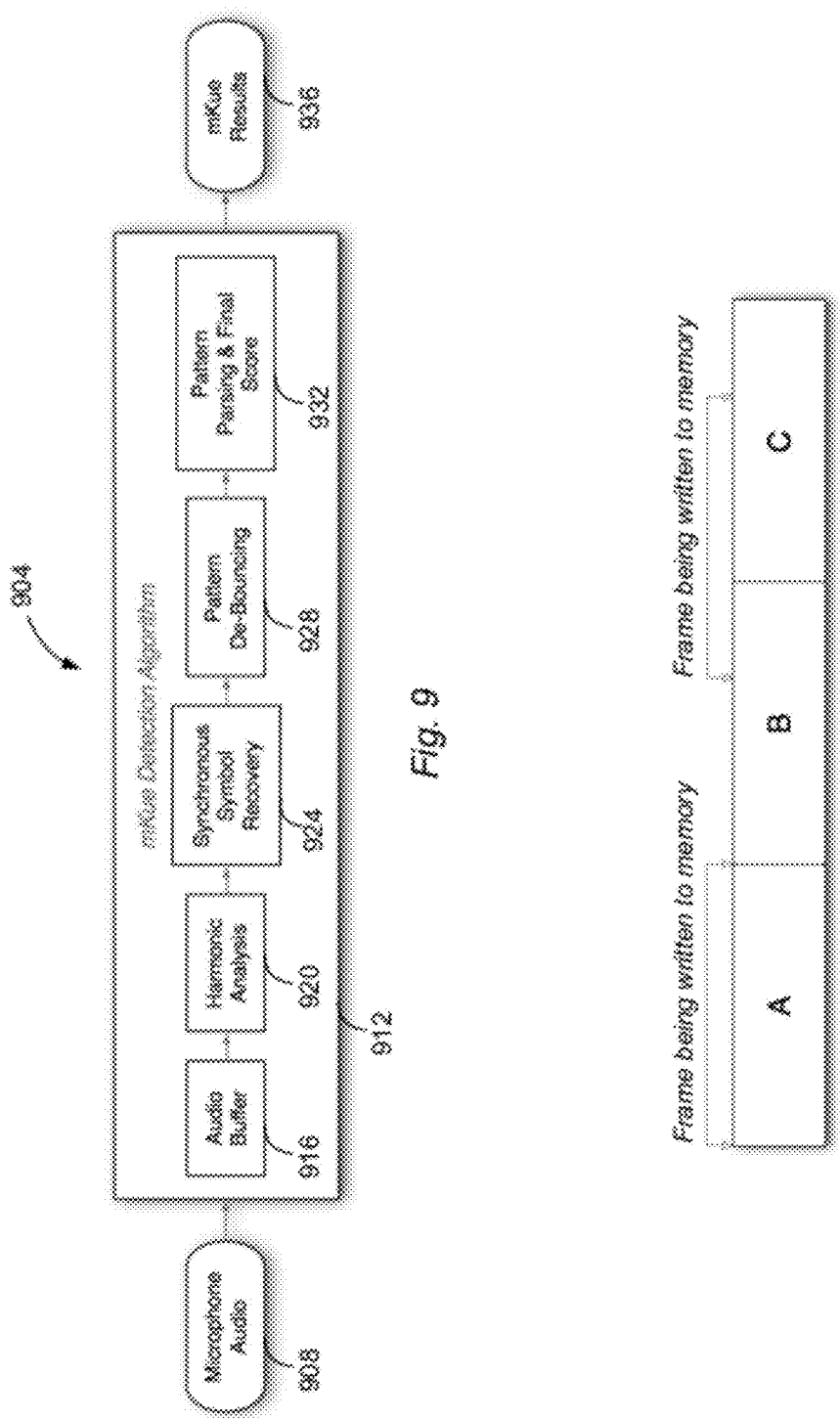

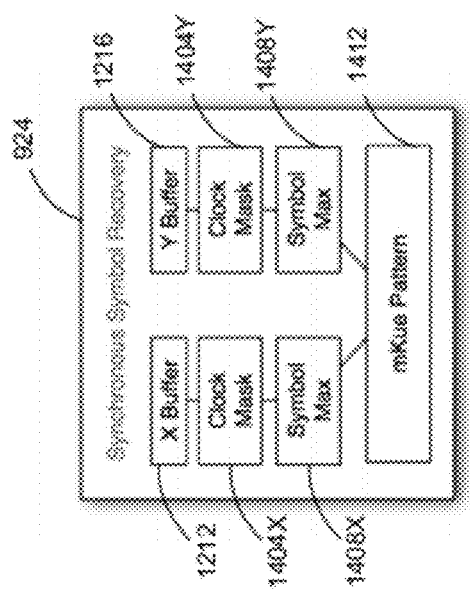
Fig. 13
Fig. 14
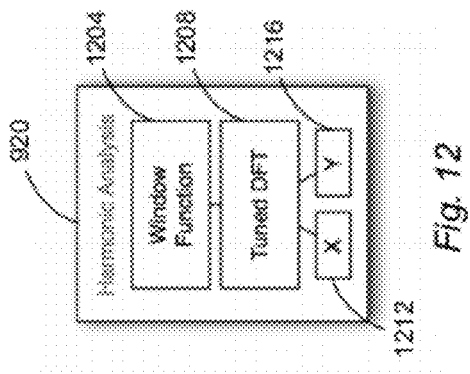
Fig. 12

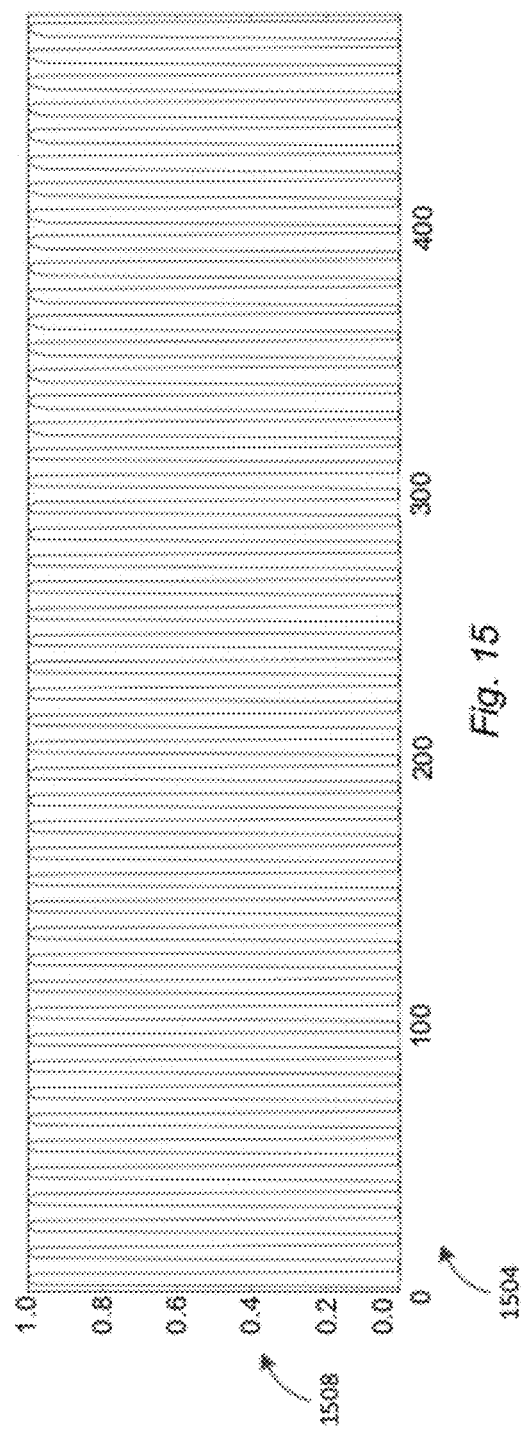

DETECTION SYSTEM AND METHOD FOR MOBILE DEVICE APPLICATION

PRIORITY CLAIM

This application is a continuation in part application of and claims priority to U.S. patent application Ser. No. 12/932,620, filed Feb. 28, 2011, entitled Mobile Device Application, which claims priority to and the benefit of U.S. Provisional Application No. 61/309,370 filed Mar. 1, 2010 and entitled Mobile Device Marketing Application.

FIELD OF THE INVENTION

The present invention relates to signal processing and in particular to a method and apparatus for obtaining and processing input from a television audio signal or other event and presenting associated product or service data to a user.

DESCRIPTION OF RELATED ART

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

Advertising agencies and marketing groups face numerous problems with modern advertising. In particular, these problems or drawbacks stem from the dilemma that no one may definitively say how many sales are actually generated by television and pre-film commercials. There is a significant delay between when a consumer sees the product advertised when they may have the impulse to buy it, and when the consumer actually has the opportunity to buy it. In addition, with new technology like digital video recorders (DVR) and Tivo®, viewers may edit out or skip over the commercials altogether.

Therefore, there is a disconnect between when advertising is viewed and when the consumer has an opportunity to purchase the advertised product or service. As a result, sales opportunities are lost because advertising happens while the consumer is away from purchase points, such as when watching TV at home, while sitting in a darkened movie theater, or while listening to the radio in rush-hour traffic.

Over the past several years, product placement has become an increasingly utilized advertising system to show products in the content of television programming and films. However, even when a consumer is inspired by product placement to purchase an item, conventional purchasing opportunities and Internet access do not provide a mechanism to overcome the above problems. The consumer must still identify the advertising content on the television screen to know what to look up on the Internet, and then at a later time recall that information and perform Internet research to locate the product for purchase.

Though there exists individual smart-phone applications dedicated to a single particular service, such as direct news feeds, there is no application that serves the advertising industry as a whole, or that provides a method for phones to receive data that identifies products directly from a television broadcast, radio, film, or during a live event. For example, there is also no application that enables consumers to instantly purchase a product they see in television or films during a broadcast or showing. The method and apparatus described below overcomes the drawbacks of the prior art and provides additional benefits.

SUMMARY OF THE INVENTION

By providing the technology to track who sees the products, as well as providing instant purchase options for consumers, the method and apparatus disclosed herein will enable consumers to immediately be presented with, research, and purchase products during advertising or product placement in television, film, radio broadcasts, live events, in-store advertising over speakers or at points of purchase, anywhere there is a method of broadcasting sound.

In general, the innovation disclosed herein provides a system and method used for detecting a non-visual cue or link using a mobile application on a personal device. Upon detection the mobile application is capable of: a) associating the non-visual link with at least one item contained in a transmitted presentation; b) connecting the personal device to information about the item in a database associated with the transmitted presentation; c) obtaining information about the content of the transmitted presentation; and presenting the information on the personal device. In one embodiment, the non-visual link is a wireless WiFi connection identifier. In another embodiment, the non-visual link is a voice command identifier. In a further embodiment, the non-visual link is an audio tag. In a different embodiment, the innovation creates and utilizes audio tags which are near or at an inaudible frequency. In various other embodiments the audio tag may not be associated with a visual presentation. For example, in a store, a consumer could be passing a rack of clothing and receive an sequence signal transmitted from a localized speaker that gives them a coupon relating to that rack of clothes. The sequence signals may be referred to as mkues. It is also contemplated that hotel guests could receive special offers on their phones as they pass by the restaurant, or audience members could receive discount on CD purchase while still in the concert.

In a still different embodiment, the innovation provides such a system or method such that the audio tags are temporally aligned to the display of the associated visible event. As such, the audio tag is associated with individual items seen in a TV show or film so that product pages appear on a mobile device at the same time the product appears on the TV or movie screen. That temporal concurrence provides an advantage over prior art advertising systems. In another embodiment, the system or method further comprises connecting the user to a database having information about the item. In a further embodiment, the database displays products associated with the visible event. In a different embodiment, the user can purchase the item from the database or other source. In another embodiment, the innovation provides a system or method where the user can forward information about the item through the Internet to an email address or to another person.

In a further embodiment, the system or method further comprises maintaining a database of transmitted presentations and providing a link between the mobile device and information regarding a selected transmitted presentation. In one embodiment, the transmitted presentation is presented via broadcast. In a different embodiment, the transmitted presentation is presented via the Internet. In a further embodiment, the transmitted presentation is presented via a movie theater showing. In a still further embodiment, the transmitted presentation is associated during a live event. In a still further embodiment, the transmitted presentation is associated with environmental advertising, such as a billboard or in-store signage.

Once the product is identified, the user may click on a product and the user is presented a product page within the mobile device application with details about the product and the opportunity to purchase it from his mobile device. Information may also be collected about each user's television or film viewing patterns, history, and purchases of products placed in films and TV shows, which at this point in time does not exist for radio, television, or film.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 5 illustrates exemplary buffers.

FIG. 6 illustrates exemplary energy distribution within buffers;

FIG. 9 illustrates a block diagram of a system for detecting and decoding non-visual cues.

FIG. 11 illustrates the triple buffering arrangement.

FIG. 12 illustrate an exemplary block diagram of the harmonic analysis unit.

FIG. 13 illustrates an exemplary matrix showing rows, columns and matrix values.

FIG. 14 illustrates the synchronous symbol recovery unit comprising an X buffer and a Y buffer.

FIG. 15 illustrates a plot of a mask or temporal grid that is superimposed on delay lines.

DETAILED DESCRIPTION OF THE INVENTION

Figure 1:
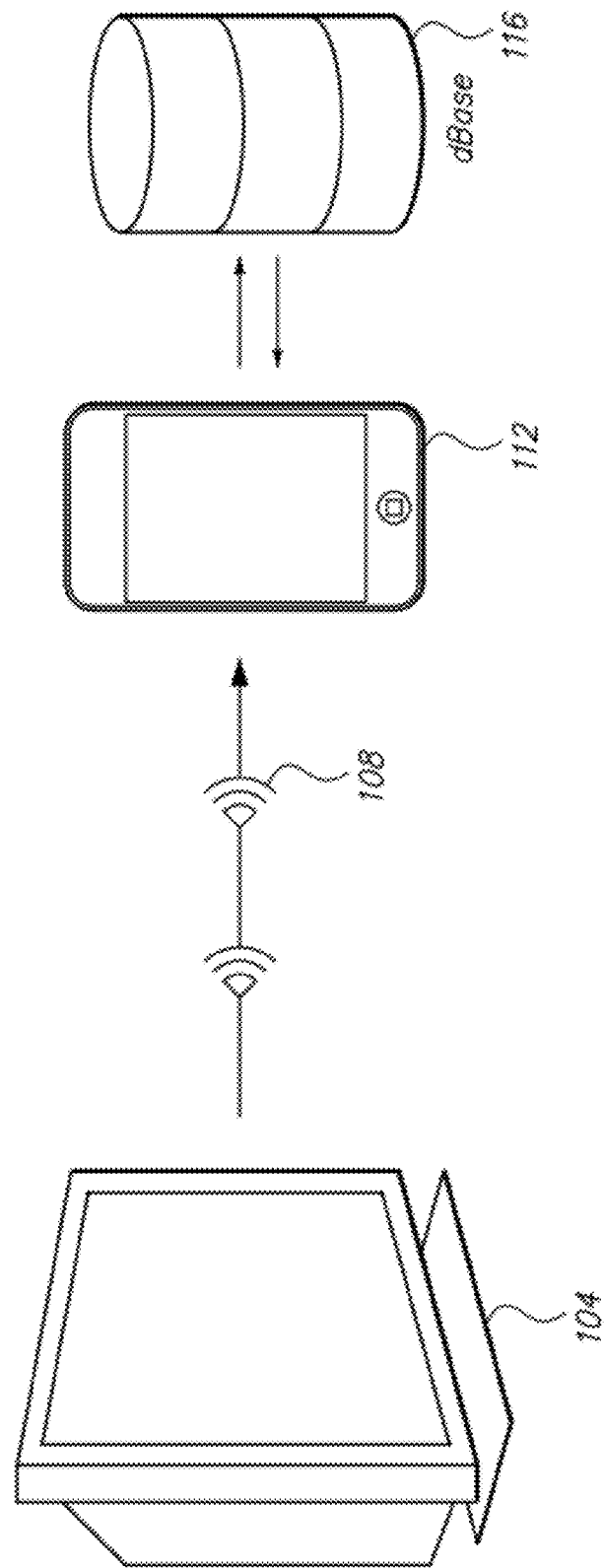
FIG. 1 illustrates an exemplary audio stream, mobile device and remote database.

The innovation disclosed herein provides a system for using inaudible audio tags to send information from non-Internet connected devices or platforms to users via mobile devices. Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims. Unless defined otherwise, all technical and scientific terms used herein have the same meaning as commonly understood by one of ordinary skill in the art to which this invention belongs. Although any materials similar or equivalent to those described herein can also be used in the practice or testing of the present invention, the preferred materials are now described.

All publications and patents cited in this specification are herein incorporated by reference as if each individual publication or patent were specifically and individually indicated to be incorporated by reference and are incorporated herein by reference to disclose and describe the materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed. It must be noted that as used herein and in the appended claims, the singular forms "a," "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Definitions

The following definitions are supplied to assist in understanding various features and/or operations of the present invention that are described herein.

"Audio tags"—the use of inaudible frequencies (frequencies beyond the limits of human hearing) or near inaudible frequencies to create audio tones, which may or may not be played along with an audible audio signal. The combination of tones read by a mobile device application identifies any item, person, presentation, or places/things/events or other information of any kind that are associated with it in a database.

"Buy button"—the one-click button with an API to the Merchant's eCommerce site. When a user clicks this, it passes the payment information and shipping information stored in his/her marketing application account to the merchant's eCommerce site for fulfillment. It also records the purchase on the user's account page.

"Celebrity"—an actor, actress, singer, or musical group.

"Channel"—the marketing application's main section.

"Channel pages"—a page within a channel, for example, for an individual television series, celebrity, movie, or video.

"Chat"—fans may chat in real time with others about a TV episode, film, 4 video, or celebrity.

"Clients"—Advertisers or content creators (anyone that makes a channel page or pays for product pages).

"Comment"—fans may comment on any Channel pages, and on any product pages. Comments may include pictures and links to other pages both in the application and on the web.

"Episode",—one television program, usually lasting a half hour or one hour. Under the TV channel, each channel page may be made up of about Episode pages so the users may go straight to the current episode.

"Fans"—the users of the marketing application.

"Film"—recorded performances for theatrical presentation, though sometimes marketed as "direct to video" release, being of duration characterized commonly understood as "feature film length".

"Follow"—fans may follow a series, celebrity, film or video so when new content is added to those channel pages, the products are automatically downloaded to the user's application, and the user is sent an alert.

"mobile device"—any personal communication device or similar portable or handheld device, such as a Blackberry, iPhone, iPad, or similar or otherwise wired or wireless communication enabled devices.

"Non-visual Cue"—any of audio tags, WiFi connection identifier, GPS, GSM, and vocal command identifier that are linked or otherwise allow access to information about an item, person, presentation, or places/things/events or other information of any kind.

"Network"—the television network on which a series airs.

"Product"—an item promoted or sold by the marketing application, e.g., clothing, accessories, furniture, locations, restaurants, clubs, coupons, offers, advertising or other items that may be associated with a TV show, film, video, or live event, signs, magazine, or celebrity endorsement.

"Product pages"—each product has one or several product pages. They may be multiple pages and include many pictures, animations, videos, sound, links to websites and other product pages within the marketing application, and a 'Buy button.

"Series"—in television, a series is a year's worth of episodes

"Sharing"—when fans send pictures, links, and comments about products and content to social networking sites, such as Facebook, MySpace, Twitter or by email to their friends.

"Video"—any of various visual recordings, for example, music videos, YouTube videos, and any other short recorded visual presentations of a performance, generally shorter in duration than film releases.

"Transmitted Presentation"—an audio and/or visual presentation of audio, video or film content, including television shows, film or other theatrical releases, videos, streamed events, live stage productions or the like.

"Voice Command Identifier"—keyword or phrase for calling up information about a visual presentation.

"WiFi Connection Identifier"—means a wireless communication within and or connected to an Internet Service Provider and relating to a product.

"Wish List"—Fans add a product to their Wish List for purchase later.

In one embodiment, the mobile device application is an application that lives on a mobile or other personal device and allows, using audio tags associated with the transmitted event, the user to get information about products or services the user views or hears in television shows or other media and optionally purchase those products or services.

In general, FIG. 1 illustrates a general overview of one common example embodiment. In this embodiment a television 104 having speakers, or any other audio generating device, generates audio signals, which are presented to viewers or listeners. Audio tags 108 are imposed upon these audio signals which are output from the speakers. The audio signal, including the tags 108, are received by a mobile device application (MD application) executing on a mobile device 112. The MD application comprises machine readable code stored on a memory and executable on a processor that is part of the mobile device 112. The MD application may comprise one or more software applications that are commonly written and downloaded to smart phone or personal computing type devices.

As discussed below in greater detail, the mobile device includes a processor and a memory. The memory stores machine readable code which is executable by the processor to detect and process the audio tags 108.

The audio tags 108 identify a product within a television program, other event, or something associated with a program or, event, advertisement signage, radio broadcast, or print layout and to provide a look up key to a database 116. The database 116 may be located remotely from the mobile device 112 and communication between the mobile processing device and the database may occur over a communication and/or computer network. The database contains information about or related to the product being presented on the television 104. In one embodiment, products shown or used in the television event are identified in the database 116 and presented to the user of the mobile device temporally concurrent with their display on the television show 112. This presents the user with information, either in real time or at a later date, about the products shown on the television event. Also provided to the user are immediate or subsequent purchase or sign up opportunities.

For example, the software application (MD application) identifies the non-visual cues 108 which are associated with each product advertised in a transmitted presentation, for instance, radio/TV/film, or live event and which in turn allows consumers to download information from the database 116 regarding the event or product and optionally make a purchase immediately with a mobile device 112. The software application is particularly suited for smart phones and tablets.

As part of this process and based on the audio tag received from the television event, the MD application recognizes the transmitted presentation that a consumer is viewing and displays a product page retrieved from the database 116 of products that was used or shown in that television event and which may be available for the consumer to purchase.

In another aspect, the MD application provides the link between the database, and other forms of media, such as film, radio, satellite, live events, DVDs or other pre-recorded videos or audio recordings, by using vocal, audio or wireless identifier information, in audio tags.

The MD application may also include a social networking component so users may chat in real time about content, post comments, upload pictures and links, and share product pages on Facebook®, MySpace®, Twitter®, via SMS, MMS or email or other web-based application programming interface.

The MD application also provides an interface for easily creating product pages and linking them to the correct show/film/video/celebrity. The MD application also includes a web interface where advertisers and television series may view the consumer usage data.

Additionally, the MD application may collect and deliver to the advertiser all the data received about the user, the products each user looked at, as well as the television shows/movies the user saw, and when a view was converted into a purchase. At the time of filing, there currently is no existing method for advertisers to gather such reliable, quantified metrics about viewers or purchases that come from advertisements on TV, Radio, or Film.

Figure 2:
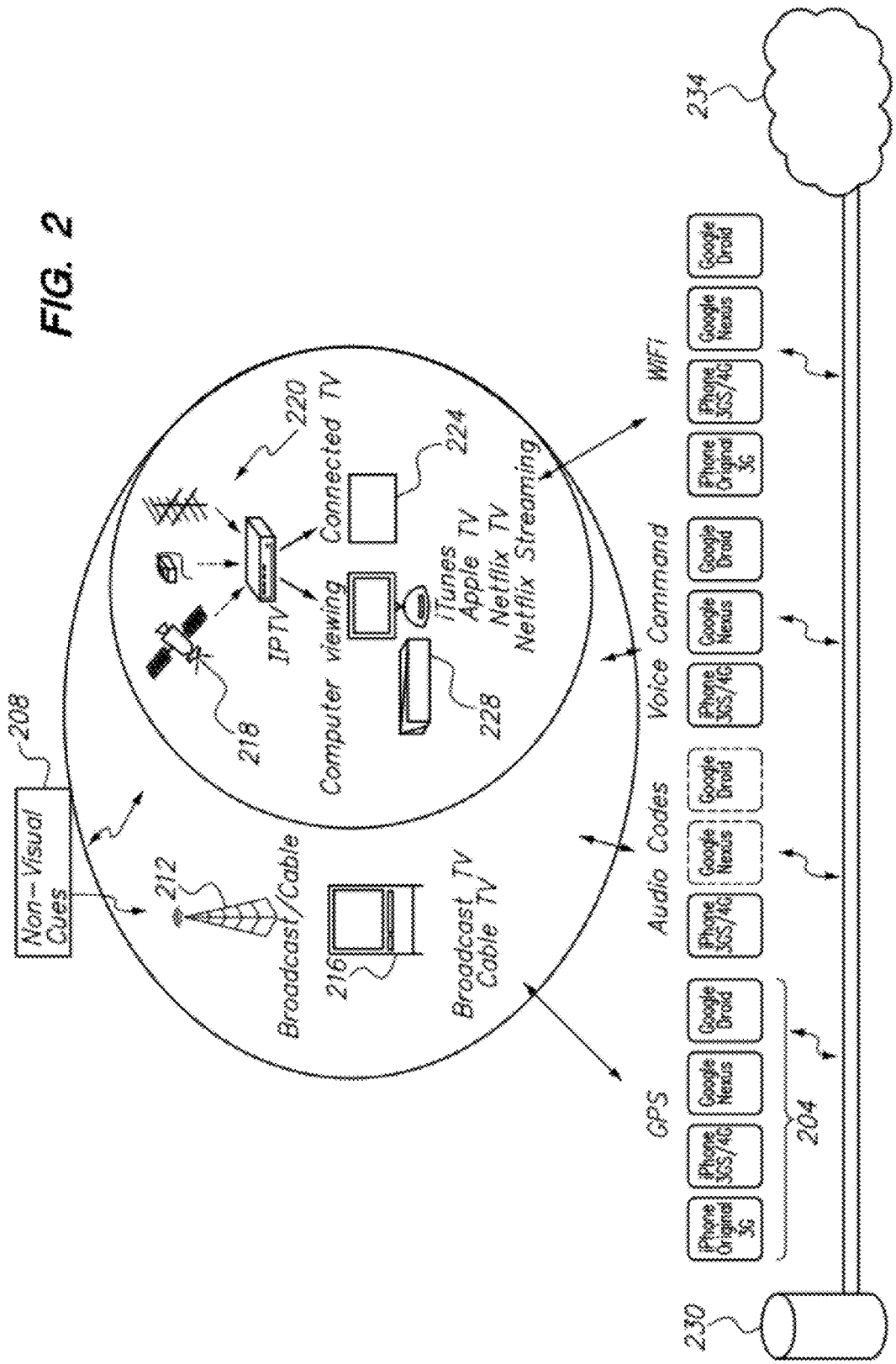
FIG. 2 illustrates an exemplary environment of operation.

To enable the services and functionality discussed herein, the system includes and interfaces with various hardware and software applications. FIG. 2 illustrates an overview of the system wide layout, which may enable the functionality described herein. It is contemplated that numerous additional vendors may cooperatively or independently supply services and hardware associated with this innovation.

As discussed above, a mobile device 204 may obtain non-visual cues in a variety of different ways. The cues may be associated with a GPS based systems which is part of numerous mobile devices 204. The GPS information may provide location data or cues to the MD application which the MD application may use to determine the location of the user and hence an event, such as a live concert or sporting competition.

The MD application may also detect and process audio tags that play at a frequency that user's phone may receive but which are less, or not, audible to a user. When the user has the MD application on and active, it actively recognizes the audio tags, and uses the tags and/or web addresses (server information) identified to query a database to identify each tag, and then present a product or list of products associated with that tag, which the user may buy using his mobile device. This applies the immediacy of the Internet for purchasing opportunities to broadcast, film and other non-Web-based platforms.

It is also contemplated that voice commands may be input to the MD application. The voice commands may be from a user or other source, such as the event itself. The voice commands may comprise an identifier for the event or a time, date, channel, or any other information that may serve as a cue and then be subsequently processed.

It is also contemplated that wireless (WiFi, cellular, G3, G4, GPS, blutooth, 802.11, or any other wireless standard or technology) data may provide the input to the MD application. The wireless data may contain information regarding the location of the user, such as with a hot spot at an event. Or by determining the content of the packets the wireless system or MD application may determine which event or television program is being watched and the MD application may use this data to locate and present the product information to the user. Wireless traffic may also be monitored and analyzed to determine information regarding the user or content of the traffic.

Also shown in FIG. 2, the mobile device 204 communicates via a communication network or computer network 234 with a remote database 230. The database 230 stores product or service information (hereinafter product information) which may be accessed and downloaded by the mobile device 204. The particular product information to download and/or the server locations may be obtained via one or more of the GPS, Audio tags, Voice Commands, or wireless or wifi data as discussed above.

The product information is displayed or otherwise provided to the user on a display of the mobile device 204. The product information from the databases 230 is associated with or in some way corresponds to the non-visual cue. From the product information a user may store, research, learn, or purchase products or services.

To link to the product information, the mobile device 204 receives one or more non-visual cues 208. Although referenced and shown in FIG. 2 generally, the non-visual cues 208 are generated to link the transmission or event with the product information stored on the database. The term transmission is defined to mean any electronic or audio transmission and may include but is not limited to television program sent via computer network, satellite, cable, airwaves, telephone lines or wirelessly.

The non-visual cues are presented to any number of different creators or broadcasters of the event or transmission. For example the non-visual cue may be imposed upon, mixed with, or configured as part of a broadcast, such as radio or traditional television programming 212. The transmission may be a television based transmission such as cable TV. The transmission may also be satellite based 218, or from a computer or communication network 220. The network communication may be from a satellite 218, DSL, Cable, fiber optics, wireless network, airwaves, or any other source. Connected to the communication network may be a television 224, radio, computer 228 or other electronic devices. The non-visual cues are discussed in greater detail below.

In the case of audio non-visual cues, the cues are generated as described below and broadcast with the audio of the transmission and detected by the MD application executing on the mobile device 204. Operation of the system shown in FIG. 2 is described below in greater detail.

Figure 3:
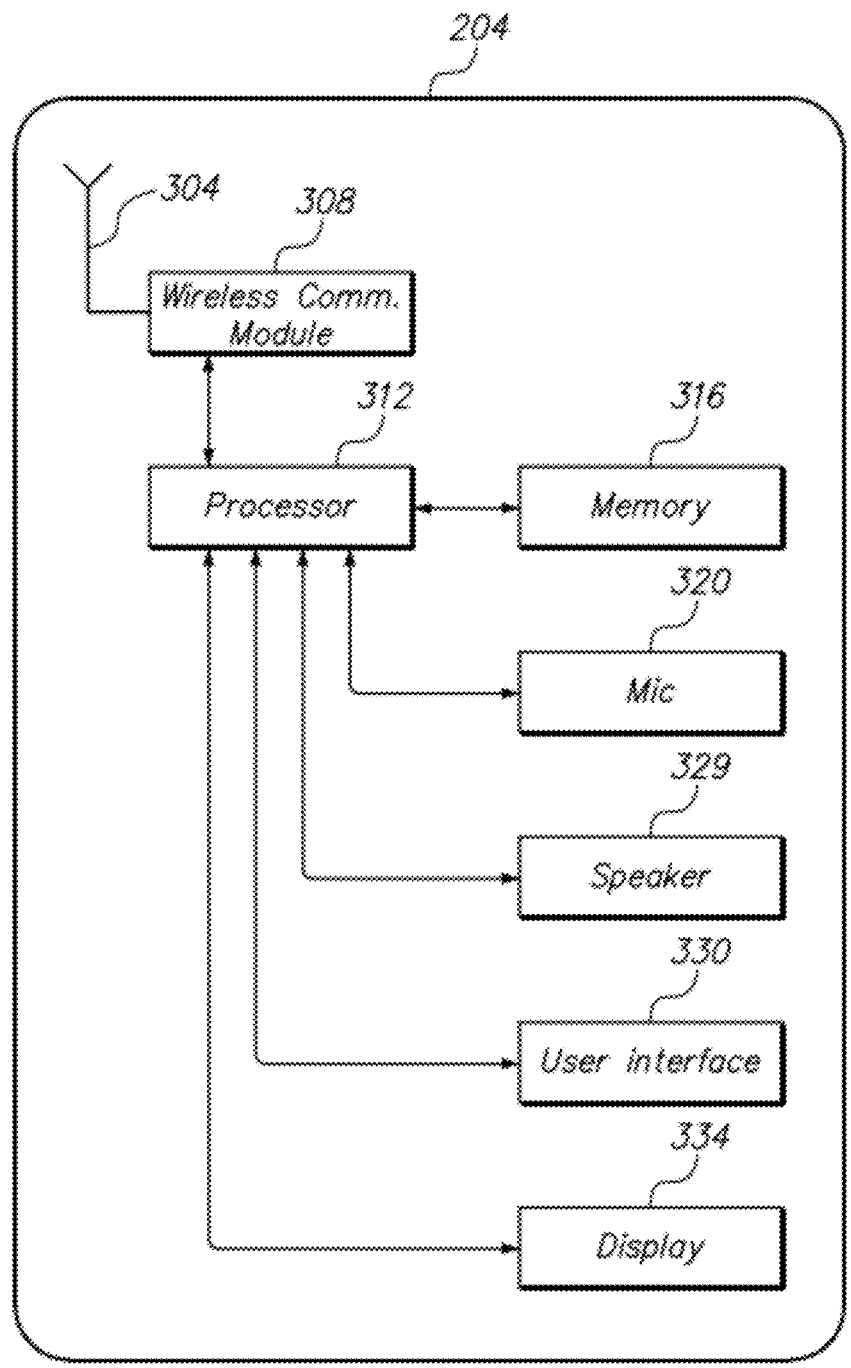
FIG. 3 illustrates an example embodiment of a mobile device.

FIG. 3 illustrates a block diagram of an exemplary mobile device. This is but one possible configuration and as such other mobile device configurations are possible. The mobile device 204 may comprise a smart phone, tablet, personal computer, laptop, pad type computing device, or any other mobile device capable of functioning as described herein.

As shown in FIG. 3, the mobile device 204 includes an antenna 304 configured to send and receive wireless signals over a wireless network. The wireless signal may comprise computer network wireless signal, cellular data signals, or any other type of wireless transmissions. Although shown with an antenna it is contemplated that a wired connection (not shown) may exist.

The antenna 304 connects to a wireless communication device 308 which may comprise an analog front end in communication with an analog or digital baseband processing system. The wireless communication device 308 performs and oversees the wireless communication via the antenna. A processor 312 connects to the wireless communication module 308 and is configured to interface with the various components of the mobile device 204. The processor 312 is capable of executing machine readable code, for example software code, which is stored on a memory 316 or received from the wireless communication module 308. Any type of special purpose or general purpose processor may be utilized.

Also part of the mobile device 204 is a display 334 configured to present visual information to the user. Any type or size display 334 may be utilized. A user interface 330 is also present and capable of receiving user input. The user interface 330 may comprise buttons, keys, touch elements, dials, wheels, scroll balls or may be configured as part of the display 334, such as in the case of a touch screen.

A microphone 320 and speaker 324 also connect to the processor 312 as shown, which provide audio information to the user and capture audio information from the environment of operation and from the user. Any type microphone 320 having the capability described herein and speaker 324 may be utilized. The microphone 320 is configured to capture audio information which may include non-visual cues. These non-visual cues may optionally be buffered in memory or one or more registers and processed by the processor 312.

In operation, the MD application comprises machine readable code residing on the memory 316 and is executed by the processor 312. The MD application receives information from the microphone 320, a non-visual cue from the environment, which triggers the processor on the MD application.

In response to the non-visual cue, the processor 312 (executing the MD application) and communication module 308 contact a remote server database via the wireless communication module 308 to retrieve product information that is associated with the cue. It is also contemplated that an Internet browser application may be utilized to communicate with the database or remote server. The remote server or database may be proprietary and accessible with only the MD application or publicly accessible on the world wide web.

Upon receipt of the requested product information from the database or remote server, the processor presents the product information to the user via the display 334 and/or the speaker 324. The user may use the user interface 330 to interact with the product data including further research, viewing or product purchasing.

Figure 4:
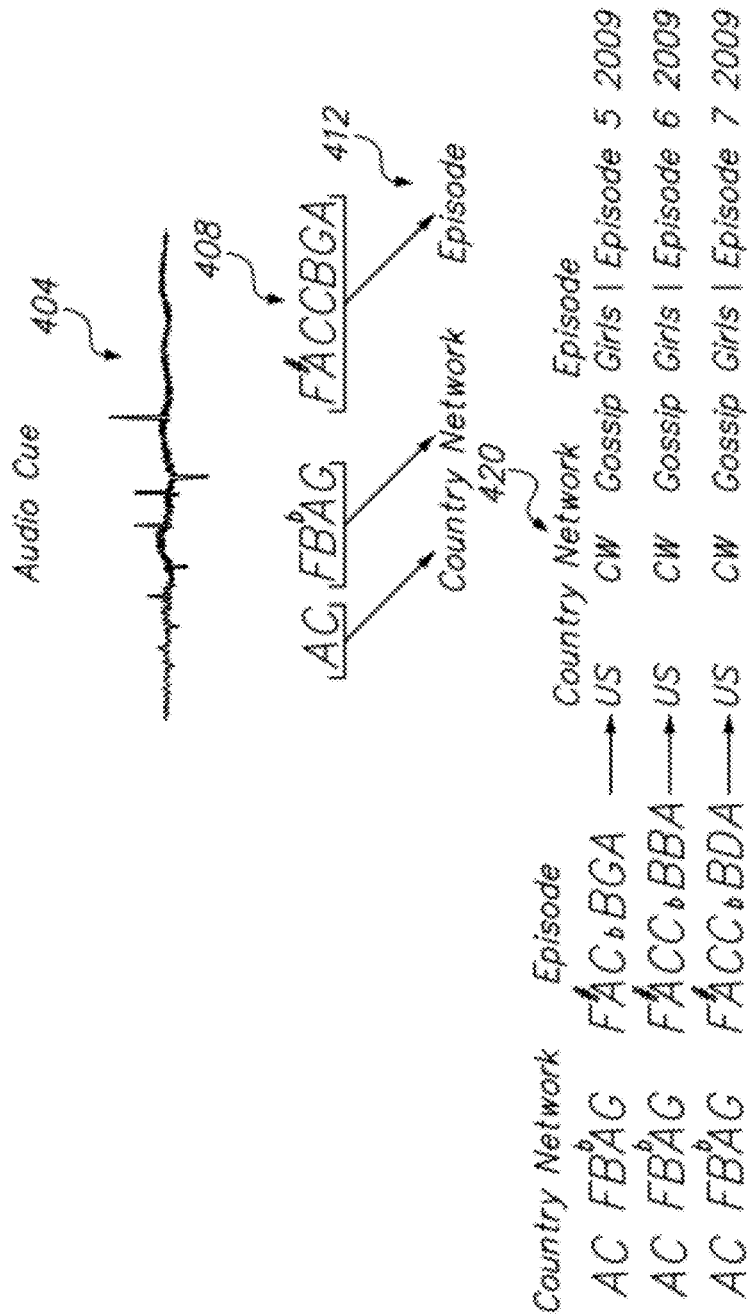
FIG. 4 illustrates an exemplary audio signal and audio tag.

FIG. 4 illustrates an example audio tag. This is but one example of an audio tag and is provided for purposes of discussion to present the concept of a non-visual cue contained in or played along with an audio signal or played alone. Additional types and formats of non-visual cues are discussed below. As shown in FIG. 4, the audio signal 404 represents sound waves which change over time in amplitude and frequency. An audio tag is imposed upon or inserted into the audio transmission. The audio tag may be blended or imposed on the audio signal in any manner currently known or developed in the future. In one embodiment the audio tag is converted to a digital signal using DTMF tones or modified DTMF tones as is described below in greater detail. Through this translation from an audio signal to a modified DTMF, the tag may be translated to an exemplary code 408 which has one or more subparts 412. The subparts 412 may correspond to various different identifying information such as country, broadcasting network, and episode. In other embodiments different identifying information 412 may be provided. Different identifying information may correspond to actual television transmission data 420, or other transmissions of different types.

In one embodiment, each product in each tv episode is identified using a 5-digit string. In this embodiment, instead of merely identifying the TV episode, every product is identified individually, so that viewers see the product appear on the mobile device at the same time as it appears on the broadcast. In other embodiments other types of strings or sequences may be utilized.

The non-visual cue may be created by any party or entity. In one embodiment a product number is assigned to the product and a television program or event number is assigned to the program or event. These numbers may form part of the non-visual cue. These numbers could also be assigned by a database administrator or the broadcasting network. These numbers that identify the product and/or program or event may be converted to a code or sequence which may be embedded in or played along with an audio transmission. Numerous different types of sequences may be utilized and created in any number of different ways. One possible type of sequence, which is discussed below, is a frequency shifted DTMF tone. The following describes a high frequency DTMF type signal.

High-Frequency DTMF Detection

One example embodiment of the innovation disclosed herein utilizes a high frequency DTMF (dual tone, multi-frequency) signal. This signal may be processed using the mobile device application. One example application that detects and processes DTMF signals is DTMFdec, which is an available software program. Any software application which may be stored on a memory as machine readable code and executable on a processor may be used to detect and process these sequences. The MD application detects high frequency DTMF tones and decodes such tags. In other embodiments, other applications or signal processing systems may be utilized for this functionality. In the example embodiment described below, the tone detection functionality utilizes a non-standard set of DTMF signals that are transposed to higher frequencies which, as discussed herein, makes these tones much more difficult or impossible for a human to hear.

DTMF tone detection is commonly done in the POTS telephone system, but these tones are in the audible range thus were not suitable for this application. Other drawbacks were present in prior art systems. To overcome these drawbacks, a new DTMF detection and processing algorithm has been developed and implemented. One such improvement comprises increasing the sample rate to 44.1 kHz. This increase allows for detection of high frequency tones. In addition, in one embodiment this innovation increases the buffer size to 1024 samples, to allow better frequency resolution and utilizes overlapping buffers, to produce better time resolution for the frequency discrimination. In other embodiments, other buffer sizes may be utilized. It is also contemplated to utilize a new DTMF filter set with seven new resonant frequencies that replace the existing eight center frequencies of traditional DTMF tones. The new frequencies and corresponding characters codes are shown below in Table 1. This illustrates the dual tones (frequency) for each character 1, 2, 3, 4, F, 5, 6, 7, R, 8, 9, 0.

TABLE 1

High-Frequency DTMF Table

| Frequency (Hz) | 15991 | 16103 | 16319 | 16417 |
|---|---|---|---|---|
| 16217 | 1 | 2 | 3 | 4 |
| 16519 | F | 5 | 6 | 7 |
| 16619 | R | 8 | 9 | 0 |

It is contemplated that EECM Sequences (Embedded Event Codes for Multimedia) may be utilized. These codes may also be referred to herein as DTMF sequences. One example syntax for a EECM is shown below.

$F_R 1_R 0_R 0_R 5_R 1_R 3_R 0_R 0_R 1_R 1_R 7_R 1_R 9_R 8_R 6_R 6_R 4_R 0_R F$ where F represents a framing character and R represents an interleave or space character. In this embodiment the code sequence repeats 3 times in 5 seconds.

The important features for the purposes of this algorithm are that the sequence begins and end with "F" (the framing character). This aids in recognition of the sequence by the detection software and processing hardware. The sequence represents a series of digits and the character "R" is interleaved, thus separating each character to aid in detection. This was found to be a helpful feature in certain configurations because the algorithm is not currently designed to detect repeating characters. Leaving out the "R" characters may otherwise disable the ability to detect a repeated character such as "00". Finally, in this example embodiment each symbol is 75 ms long, with 5 ms of silence between each. In other embodiments, other timing is contemplated. Thus in this embodiment, the length for a sequence of N digits is approximately (2N+3)*0.08 seconds. For example, 18 digits plus framing and separating characters would be 3.12 seconds.

Creation of the Sequence

The sequence, which comprises the audio tag, may be created in any manner. In one embodiment a software program Audition 3 from Adobe Inc. in San Jose, Calif. was used to generate the test sequences and could be used by a party generating the non-visual cues which are embedded in or imposed on an audio transmission. Within the Audition 3 program, the tool for generating DTMF signals lets the user customize the frequencies. However, because the symbols cannot be changed in the Audition 3 program, some transposition was necessary, which is shown in Table 2. In one embodiment an Audacity script may also be utilized to generate DTMF signals.

TABLE 2

Transposition from standard DTMF to the new characters

| Standard DTMF | 1 | 2 | 3 | A | 4 | 5 | 6 | B | 7 | 8 | 9 | C | * | 0 | # | D |
|---|---|---|---|---|---|---|---|---|---|---|---|---|---|---|---|---|---|
| New Character | 1 | 2 | 3 | 4 | F | 5 | 6 | 7 | R | 8 | 9 | 0 | — | — | — | — |

It is also contemplated with regard to the sequences and the insertion of the tones into the audio signal that in one embodiment the lowest tone frequency was chosen to be higher in frequency that either the NTSC or PAL/SECAM color horizontal subcarrier frequencies as these sounds were fairly common prior to ATSC digital TV and will continue to be found in many recording and video content going forward. Therefore, by placing the lowest frequency tone above the frequency of NTSC and PAL/SECAM interference can be avoided. In addition, the tones may all be selected to not be near intermodulation distortion products created by the combination of the line frequency and the AC power frequency (e.g., 50 or 60 Hz). In addition, the tones may all be selected as prime numbers so as to further remove them from any musically related high frequency overtones.

In one embodiment all the tones are restricted in frequency to less than 18 kHz so as to improve proper playback for even the least expensive consumer hardware. In other embodiments the tones may be at or above 18 kHz to reduce the likelihood of listener hearing the tones that form the audio tag. As can be appreciated, there is a tradeoff so it is also contemplated that the tones are of sufficiently high frequency so as to be inaudible by most adults and less audible by most teen age children.

Also with regard to selection and creation of the sequences and related tones, it was assuming that a typical AC-3 dialnorm setting was −22 to −26. Dialnorm is the meta-data parameter that controls decoder gain within the proprietary Dolby Laboratories® Dolby Digital (AC-3) audio compression system. It ranges in integer values from 31, where decoder gain remains at unity, to a value of 1, where decoder gain is reduced by 30 dB.

In one embodiment DTMF amplitudes can be set high enough to maintain a signal-to-noise ratio that will allow robust identification, but low enough to remain minimally audible at expected playback levels. For example, if program material is expected to occasionally rise to −40 dBFS/Hz spectrum level in the high frequency region and a signal-to-noise ratio of 12 dB is determined to result in robust detection, the DTMF sequence can be set to −28 dBFS/Hz spectrum level.

In another embodiment, the EECM amplitudes of −8 dB and −14 dBfs were chosen so as to be about 10 to 14 dB louder than typical dialog. This ensures sufficient amplitude for detection while preventing audibility in most situations. It also is of sufficient amplitude so as to overcome any tendency for a lossy codec such as AC-3 or AAC (advanced audio coding) to deem the EECM signals to below any masking thresholds.

The initial durations for each symbol (each dual tone, multi-frequency represents a symbol) were chosen based on the theoretical response of the software filters. Initial test results revealed that recognition was not ideal so, symbol duration was extended to both provide more time for the post-filter processing to occur and, to provide some immunity to acoustical interference. In one embodiment the time for each symbol is doubled, and used less symbols per EECM sequence. For example, the system may use 6 symbols and repeating 3 times, for a total of a 5 sec sequence.

Algorithm and Buffering

When the audio signal is received at the MD application, one or more buffers are utilized to store the code for subsequent or concurrent processing. The buffers may comprise memory, registers, or any other data storage device. In one embodiment there are two buffers, A & B, which are filled simultaneously. In this example embodiment, each buffer is 1024 samples long, but the indices are 512 samples apart so one of the two buffers will fill up every 512 samples, as illustrated in FIG. 5. In other embodiments other numbers of buffers may be used and each buffer may contain any number of samples.

Because of this overlap in the buffers, it is possible to potentially detect a new signal every 1.5 buffer frames (every 35 ms at 44.1 kHz sampling). As shown in FIG. 6, if audio event X ends near the beginning of Buffer B1, the energy of event X will persist through the end of B1. The audio event X may comprise a sequence. When Buffer A2 fills, it will be the first buffer without any event X signal left, thus allowing the system to detect the new signal Y (1536 samples after B1 began).

However, it should also be noted that this assumes that the audio signal and hence the sequence has enough energy (for example, the audio is loud enough) so that the MD application may detect a partial signal. Because the system may benefit from windowing (fade in/out) the audio, as explained in the next section, the maximum amplitude will not occur until some time later. If the volume is not turned up high enough, the algorithm may not be able to detect the audio energy until the next frame. Therefore, the practical limit is double the theoretical limit, resulting in detection of a new signal every 3 frames (every 70 ms). Depending on the room environment longer detection periods may occur.

In one example embodiment, a Discrete Fourier Transform (DFT) or other frequency domain processing is used to calculate the energy at a particular frequencies. In this example embodiment, instead of calculating the energy at every frequency up to some maximum (e.g., half the sample rate), this high-frequency algorithm only calculates the energy at frequencies starting at 15 kHz and going up 2 kHz, to 17 kHz since this is the frequency range of the signal. In other embodiment different frequency windows may undergo the DFT function.

For purposes of signal processing and in this example embodiment, two tables are created for calculating the DFT—a sine table and a cosine table. These tables represent the values of a sine/cosine wave at each frequency from 15 kHz to 17 kHz. The audio energy at frequency F Hz can then be calculating by multiplying the audio by both the F Hz sine and F Hz cosine waves and averaging these numbers together.

Under ideal circumstances, a frame size of 1024 samples would allow for division of the frequency range into 512 different values (in steps of 44100/1024=43 Hz). However, splitting the audio into frames has the effect of blurring the spectrum. As such, if the frames were left alone, a single tone would get spread to an unacceptable degree.

This spreading can be reduced or minimized by fading the audio in at the beginning of the frame and fading it out at the end of the frame. This operation may be referred to generally as windowing. In one embodiment a Hamming 'window' applies the optimal fading to distinguish between different frequencies. With this window, the spread is essentially limited to 3 points, allowing the MD application to detect another frequency 2 DFT points in either direction. This means that in this example embodiment the system can reliably detect signals that are at least 86 Hz (=2*44100/1024) apart.

To further aid in detection and decoding of the audio tag, error detection and correction may be provided and enabled. In one embodiment the error detection & correction scheme may be used in combination with a DTMF sequence. In one embodiment an extra digit that represents an aspect of the other digits is incorporated in to the sequence. For example, a 5-digit DTMF sequence may include or be supplemented with a check value that could be as check digit. For example, XXXXX %9 with remainder: %=modulus, or the remainder after division by 9 where XXXXX is the 5-digit DTMF sequence, and the check value is a number 0-8. In this example, if the DTMF sequence is 12345, the check value should be 6, for a full code of 12345-6. If the system only detects 1245-6, the error correction software can determine that there's probably a missing '3' in the sequence because the only codes that fit are: 31245-6, 13245-6, 12345-6, 12435-6, 12453-6, and 12456-0. Then the system can cross-check the codes against a database of known and acceptable codes to determine which one(s) match active audio tags. In practice the check digit could be calculated as X % N, where X an a decimal number represented by a string of DTMF symbols and N is any number.

Testing and Validation

Three test sequences were used to verify the performance of the algorithm and the MD application. These sequences are set forth below.

EECM1—$F_R 1_R 0_R 0_R 5_R 1_R 3_R 0_R 0_R 1_R 1_R 7_R 1_R 9_R 8_R 6_R 6_R 4_R 0_R F$
EECM2—$F_R 1_R 0_R 0_R 4_R 0_R 6_R 0_R 1_R 5_R 2_R 6_R 3_R 3_R 5_R 8_R 9_R 8_R 0_R F$
EECM3—$F_R 0_R 9_R 1_R 1_R 1_R 4_R 4_R 5_R 7_R 3_R 2_R 4_R 3_R 7_R 7_R 8_R 2_R 0_R F$

In addition, initial tests results revealed that recognition was not as expected, it was decided that the "Reserved" symbol should be used as a spacing symbol, interleaved so as to separate each numeric symbol from the preceding and following symbols.

During testing these tones were played at a low level in a moderately quiet room (48 dB SPL unweighted ambient noise, 51 dB SPL while tones were playing), and all sequences were correctly recognized 50 out of 50 times.

The method of audio tagging described herein provides advantages over prior art system. For example, fingerprinting runs an algorithm to match the sounds, rhythms, and/or timing of a soundstream to a database of sounds/rhythms/timings. This is similar to matching fingerprints to a database of fingerprints. When it finds a match, it identifies that song. However, this fingerprinting method suffers from several drawbacks. For example, it has high overhead because the audio files have to first be printed and in the database in order for there to be a match. In addition, it is imprecise because it only reveals the song/episode you're watching. It can not identify anything within that song/episode, like individual products. Finally, it is non-proprietary because anyone can build a database and start fingerprinting song/TV shows/movies.

Another option is watermarking which creates a data stream that hides within a soundstream. Those sounds are then "hidden" within the soundstream. Watermarking suffers from high overhead because the marks are be hidden by taking a track out of a song so the watermark can go in, or masking it with loud noises from the song or soundtrack. Thus, it is audible when nothing else is playing and it is not robust because it usually requires other hardware to decode thus usually found on set-top boxes. Finally, watermarking does not survive "over the air" transmission well, because these are in a range where the bulk of ambient sound exists, so are easily distorted when not transmitted through a cable.

The sequences described herein are inaudible, robust, audio tags. These tags have the advantage of low overhead because a 5 sec sequence may be put onto any audio stream post-production with no complex embedding. The tags are robust because at high frequencies there are almost no ambient noises that interfere (except breaking glass) they can be played over the air, across a movie theater, through the living room, in a hotel lobby, etc. The audio tags are also precise because they are inaudible and only 3 or 5 sec long, they can be put literally anywhere in a soundtrack—or used without any soundtrack at all. They could play in a silent room and trigger a mobile device phone. In addition, the audio tags are proprietary in that unless the codec is configured to process the sequence, it can not decipher the code. Finally, the codes are resilient because testing has shown that most industry standard Dolby compression will have no effect on them. So the codes can go into a show or song at the production house, and survive broadcast, rebroadcast, conversion to DVD, IPTV, all but the most badly compressed streaming video.

Figure 7:
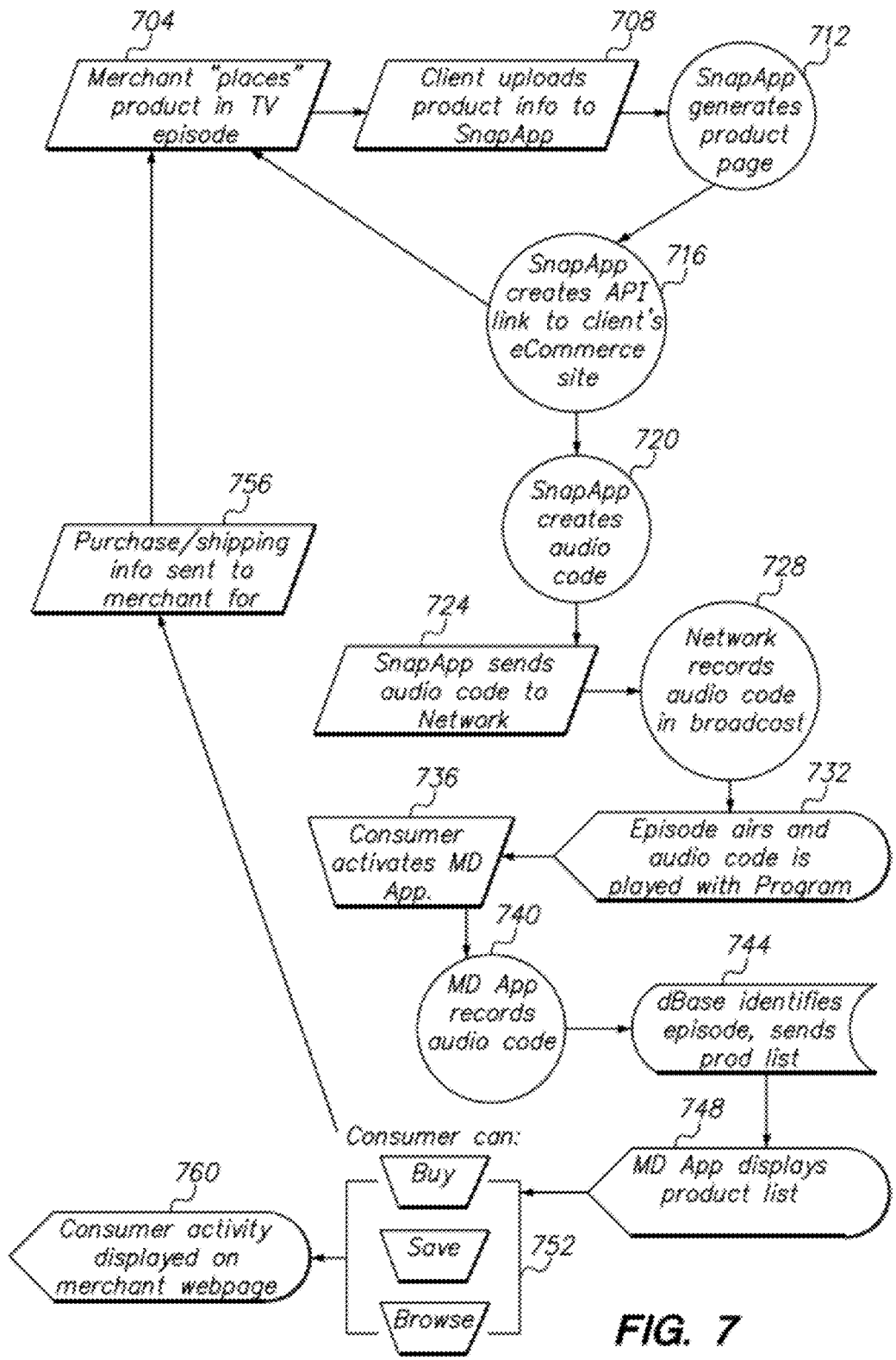
FIG. 7 is a flow diagram of an example method of operation.

FIG. 7 illustrates an operational flow diagram of an example method of operation. This is but one possible method of operation and as such, one of ordinary skill in the art may arrive at other methods of operation without departing from the claims that follow. Although this example method of operation is described in the context of a television product placement, it is contemplated that this method may be expanded to services or other placements in other media. In addition, other events or transmission beyond television may utilize this technology and method including but not limited to radio, internet broadcasts, satellite, or live events.

At a step 704 the merchant places a product in a television episode. The product may comprise any type product that is used or seen in a television episode. The merchant may comprise any part that is part of the sales or manufacturing chain, or may comprise a third party company that performs product placement. Prior to or after step 704, the client or the party placing the product in the program uploads product information to a database administrator. In this example embodiment, the database administrator or system is referred to as a snapapp. The snapapp may also be considered a remote server configured with machine readable code. At step 712 the snapapp generates the product pages and as part of this process the product pages are uploaded to the native application, or established in an Internet accessible database, such as database 230 in FIG. 2. This provides user or MD application accessible data on the database which provides additional information and purchasing information about the product.

At a step 716 the snapapp creates a link, such as an application program interface (API) link to the client ecommerce site. This link may be part of the product page on the database to allow for purchasing of the product when viewing the product page on a mobile device. From step 716 the operation may also return to step 704 for further merchant processing or for the same or another merchant to place products within or as part of the television show.

At a step 720 the operation snapapp generates an audio tag. The tag comprises the non-visual cue. The audio tag comprises an audio representation of a code that identifies a product. Alternatively a single tag may identify the entire program or live event. This tag, when processed through a microphone, allows a user using the MD application on a mobile device to access the product information on the database.

At a step 724 the snapapp sends the audio tag to a television network or the entity producing the television show or any entity or individual capable of imposing or mixing the audio tag into the television program. The audio tag may comprise the high frequency modified DTMF signal as described above. At a step 728, the network or other producing entity records or imposes the audio tag in the broadcast. The television show, when broadcast, has this audio tag as part of the audio portion of the broadcast.

At a step 732, when the episode airs and is broadcast or otherwise presented to an audience, the audio tag is likewise presented with the broadcast. In one embodiment the audio tag is presented each time a product is on the television screen. In other embodiments the audio tag repeats every 30 seconds throughout the broadcast. It is contemplated that more than one product placement may occur within a television program and as such, the program may contain numerous audio tags which correspond to different products within the program. For example, during the show's first 3 minute scene when an actor is wearing a particular clothing item a first tag associated with the clothing item is played. Then during a second scene when an actor is wearing a particular item of jewelry, a second audio tag associated with the jewelry is played. Different tags may be transmitted, such that the tags correspond to different products within the television program. In one embodiment the sequences are played once upon the first appearance of an item and then not repeated thereafter. In other embodiments the sequences may repeat.

At a step 736 a user of a mobile device activates the MD application that is executable on their mobile device. As part of the activation the MD application detects and optionally buffers audio signals detected by the microphone of the mobile device. This occurs at a step 740. Using the processor of the mobile device the MD application processes the audio tag to determine its numeric value and forwards the code to a remote database. The code identifies the particular television program and/or product in the television program. At this stage and at a step 744, a server associated with the database transmits, to the MD application executing on the mobile device, the product information stored in the database.

At a step 748 the MD application displays the product information to the user of the mobile device on the display of the mobile device concurrent with its display on the television screen or movie screen. The user may then view the product and product information and video, text, and audio which may be presented to the user on the mobile device. At a step 752, the MD application presents options or links for the user to purchase the product, save the product information, or browse additional details or related information about the product or related products. Additional options may be available at step 752 including but not limited to forwarding the product information or web page link to another via SMS, MMS or email, or to Facebook®, or Twitter® accounts.

From step 752 the purchase operation may be linked to a step 756 where the purchase, payment, and shipping options are presented to a merchant or third party processor which initially placed or created the product placement within the television program. Likewise, from step 752 the activity of the user of the MD application on the mobile device, also referred to as a consumer, may be forwarded to either the merchant or to a third party marketing agent web page. This occurs as step 760. The viewing and purchasing behavior of the MD application user may be monitored so that better product offerings may be created.

In this fashion, the marketing application can be utilized to identify products that are used in television shows and films, display information about them on a viewer's mobile device as they're seeing them on TV or on movie screens, where the user may purchase them or click a link to the advertiser's website.

Once the user has accessed the consumer areas of the marketing application, various purchase and fulfillment features are used to complete a purchase. For example, credit card information and shipping information may be saved in each consumer's account for use at the time of purchase. This allows consumers to make purchases with one click, using the already-saved credit card and shipping information. The marketing application then passes purchase and shipping information to each advertiser or merchant at the time of purchase, for verification and fulfillment. Finally, the marketing application sends a confirmation to the consumer when a purchase has been completed and records that purchase on an account page for each consumer.

An advertiser interface provides a web-based interface where advertisers may create their product pages and associate them with the video/film/celebrity. This allows advertisers to upload images, video clips, descriptions, price, etc., and stores an account page for each advertiser with a database of all products that advertiser has uploaded for sale through the marketing application.

Database query records may also be stored for each product. This aids the advertiser or merchant in that metrics may be displayed about the number of people that looked at a product, clicked to a website from a product page, and purchased a product. It also records an accounting of all sales made for each advertiser. Another feature is that the marketing application may record an accounting of all clicks made by consumers from a link in the marketing application to that advertiser's website. Another feature is that the marketing application may record what show a consumer was watching, when he was watching it, and what products he was interested in viewing.

Figure 8:
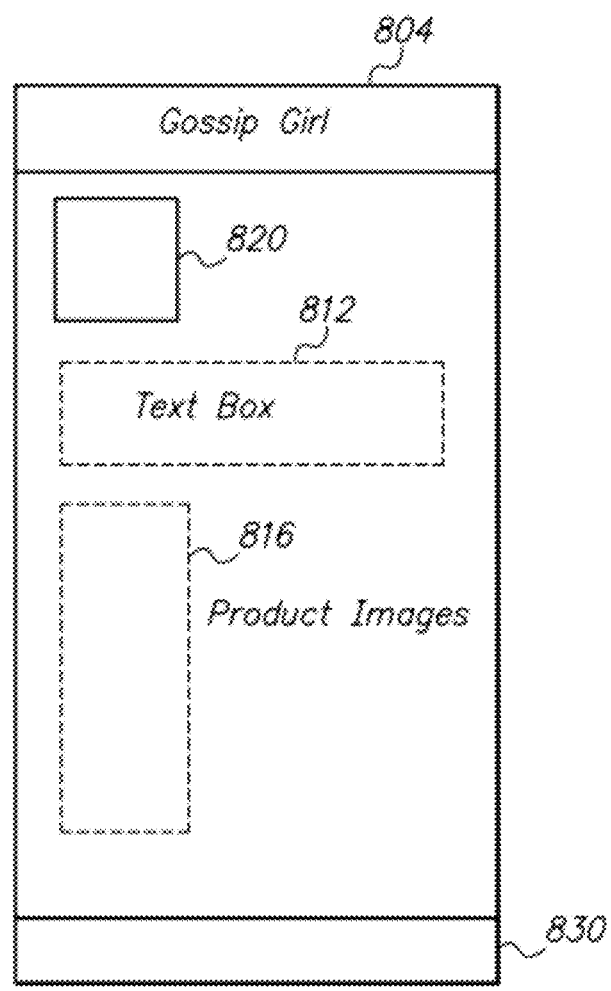
FIG. 8 illustrates an exemplary screen display.

FIG. 8A illustrates an exemplary MD application display page. This page may be displayed on the electronic display of the mobile device to present product information to a user. The page includes a header 804 showing the name of the television program being shown on the television. A text box 812 provides text and numeric information regarding the product while an image area at the bottom of the display 816 may provide one or more product pictures, graphics or multimedia. As part of this display are one or more links which lead the user to more information about the product and purchasing opportunities. In this example layout one or more scrollable thumbnails may be provided to highlight past and future products that are highlighted in the television program and for which downloadable product information is available. A toolbar 830 is present at the bottom of the display for additional functionality. The toolbar 830 may include search tab to search for programs, episodes, products or other information. The toolbar 830 may also include a television tab by which a user may access a list of television programs that are currently viewable or which have been previously presented. The television tab may lead to one more search fields to aid the user in locating a television program. The toolbar 830 may also include a film tab, which is similar to a television tab but instead provides means for the user to locate film media. A favorite tab may also be part of the toolbar 830 to allow the user to mark favorite television programs, films, or products. Also part of the toolbar 830 may be a love it tab. The love it tab may be used by the user to mark products that the user wants to buy or save.

In various other embodiments it may be desirable to provide a GPS either as part of the toolbar 830 or other functionality of the MD application. With such a function the user would click a button or activate the GPS function and the application checks the GPS provided location of the mobile device to determine location/time, and the marketing application returns a list of TV shows available at that time for that particular location or when near products that have been saved as favorites or love it products.

The MD application may be provided with proximity alerts that may utilize the GPS data or other location based data. Proximity alerts comprise information set to the mobile device application or independently received by the mobile device that occur when the mobile device is within a certain distance from the proximity transmitter. The signals may also comprise wireless signals from a wireless network, WiFi, GPS based information, cellular network cell tower location based data, or blue tooth signals. In one embodiment, the users may set alerts for products they have seen on the marketing application and the MD application will tell them when they're near a purchase point for that product.

The marketing application also may function as a personal shopping assistant (PSA). Using an individual's shopping behavior on the marketing application, the PSA may recommend items, colors, sizes, etc., enabling merchant cross-selling.

The MD application may be adapted for use in social gaming contexts. The marketing application may create a custom interface for online games like World of Warcraft and Second Life that allows merchants to display real products in those games, and the user may then click to buy the real products from the marketing application. Audio may be downloaded during the network connection which supports these or other on-line games or wireless network signals received by the mobile device may contain such information.

The MD application may encompass and be enabled for multiple platforms. For example, the MD application may be built to work on all smart phones and televisions, including but not limited to the iPhone, Android, Blackberry, Web, Xbox, BlueRay, Tivo, and a TV overlay for those without smart phones. The MD application may also work at movie theaters and when detecting and recording or buffering a radio transmitted audio signal.

The MD application also encompasses the addition of convergence products. For example, the MD application may be adapted to work with broadcast radio, Internet radio, WIFI, Bluetooth, RFID and other emerging technologies, so when computers and televisions are one piece of hardware, it will still be able to provide a way for the user to buy an item he sees embedded in the content of a television show.

The MD application also contemplates an interface with social networks. The users of the MD application may upload their purchases or wish-list to social networks like Facebook or MySpace where friends may access those products and purchase them from within those applications. This allows for viral marketing of products that are user initiated.

Other useful features may be adopted, for instance, the MD application may identify the time and date at the mobile device's location and return a short list of video/films presently airing, from which the viewer may select a show. The MD application may then query the database for the list of associated products and displays those products on the mobile device.

The MD application features are used to enhance the user's experience, utilizing various advantages in mobile technology. For example a feature could be added that creates and stores a database of videos/films/celebrities, with their associated products. Other features could include an application that creates product pages for each product that includes pictures, video, animations, descriptions, price, a link to the advertiser's website and a purchase option. Other features might organize product lists by the video/film/celebrity associated with each list. The MD application might allow users to share products on Facebook, Twitter, MySpace and by email, or allow users to leave comments on product pages or chat in real time about products and videos/films/celebrities.

It is also contemplated that an active listening mode may be enabled on the MD application such that the mobile device actively monitors the audio signals and displays product or other information when the MD application detects an audio tag. This may occur without any user input. This may occur even if the mobile device is engaged in another activity such as playing a game working with another application.

Purchase Product

Naturally, most product placement is focused on having a user of the MD application become a consumer and purchase products placed into events or transmission and viewed on the mobile device based on audio tags. In this way and as discussed above, the MD application may allow consumers to click a buy button and purchase from within the application, or click links to purchase products from an external web, or to subscribe to certain videos/films/celebrities and automatically receive a new list of products downloaded to their mobile devices as soon as they become available. Consumers will be allowed to save products to a wish list to purchase later.

Vocal Commands

It is also contemplated that the mobile application be configured to allow the user to say the name of the show to pull up that channel page, for devices with voice recognition. The MD application recognizes the video/film when a consumer speaks the name of the video/film into the mobile device, queries the database for the list of associated products, and displays those products on the mobile device.

The MD application may be configured to recognize celebrity names, TV series titles, film titles, or video titles that are in the database, although a protocol will also be provided for when the application doesn't recognize the title (e.g., presents "sounds like" options to choose from.)

WiFi and Wireless

The MD application may be configured so that when the user clicks the "wireless icon" button the marketing application communicates with the video device through its WiFi connection, determining the video, film, series being watched via a wireless connection and returns the correct page on the marketing application.

Visual Cues

The MD application may also be configured to identify products seen in print (magazines, newspapers, signs), by placing a Quick Response (QR) tag on the print image. The MD application scans that QR tag and displays a product page for the print advertisement, with the option to purchase the product or click a link to the advertiser's website.

In this way, the marketing application may assist a user in identifying products worn or used by celebrities in photographs or video clips using audio tags or visual barcodes. The MD application will then display a product page for those items that identify them and allow the user to either purchase them or click to the advertiser's website.

As a result of additional research and development, various improvements and modifications have been identified and introduced to the detection of the non-visual cues as described above. The following describes in detail additional non-visual cue detection methods and a system for performing this method of detection. This method is described below in connection with FIGS. 9 through 16, which supplement FIGS. 1-8 and the description provided above.

Summary

The following discussions of the modification to the detection method are grouped into the following topics, each of which is discussed individually.

Overlapped Audio Buffering
Tuned Harmonic Analysis
Synchronous Symbol Recovery
Pattern De-bouncing
Pattern Parsing & Scoring System Diagram FIG. 9 illustrates a block diagram of a system for detecting and decoding non-visual cues. In general, the detection algorithm executed by the system of FIG. 9 returns a set of detection results, comprised of possible non-visual cues (which may referred to in a preferred embodiment as mKues) and corresponding fitness scores, as determined by the algorithm. In this configuration the sole input to the system is single-channel audio captured by a transducer (microphone) or other recording device capable of recording or detecting a non-visual cue. In another embodiment the audio may be multi-channel or a signal representing information other than an acoustic waveform may be processed by the invention. It is contemplated that this system may be configured in hardware, software comprising machine readable code stored in a memory and configured to execute on a processor) or a combination of both. The system may be that shown above in FIG. 3.

As shown in FIG. 9, the microphone connects to or provides an electrical signal to the detection algorithm components 912. For example, using the device shown above in FIG. 3, machine readable code, such as software may be stored on the memory 316 for execution on the processor 312. These components may be enabled in hardware or software or a combination of both. Each element of FIG. 9 is described below in greater detail under separate headings.

Receiving the microphone output is an audio buffer 916. An analog to digital converter (not shown) may convert the microphone output to a digital signal. The audio buffer 916 may comprise memory, registers, data storage elements, memory address locations, RAM, solid state storage or any other element capable of storing data, such as information from the microphone 908. The audio buffer 916 creates frames of audio samples.

A harmonic analysis module 920 receives the output from the audio buffer 916 and is configured to perform time domain processing on the frames of audio samples to quantify the amplitude or strength of specific frequencies. The output of the harmonic analysis module 920 connects to a synchronous symbol recovery unit 924. The synchronous symbol recovery unit 924 receives frequency data regarding the non-visual cue and performs translation on this frequency data to create probability distributions.

After the synchronous symbol recovery unit 924 is a pattern de-bouncing unit 928. The de-bouncing unit 928 analyzes and holds the non-visual cues detections until a predetermined time or number of frames have passed. The de-bouncing unit 928 may also perform scoring of detections to identify, through scoring, the best interpretation of the decoded information. The de-bouncing unit 928 may comprises software, such as machine readable or executable code configured to be stored on a memory and executed on a processor. In one embodiment the de-bouncing unit 928 comprises software code executing on a digital signal processor.

The output of the de-bouncing unit 928 feeds into or is processed by a pattern parsing and final scoring module 932. This module 932 performs processing on one or more detected non-visual cues and/or their scores to resolve the detected non-visual cues and thereby determine or resolve the character sequences that comprise the cues. In this embodiment, this process, performed by module 932, provides or outputs the most likely cue first and less likely cues thereafter. Each component or operation is now discussed below in greater detail.

Overlapped Audio Buffering

The prior detection algorithms incorporated an audio buffering strategy best described as dual non-overlapping frames. Such an approach operates by having a given device capture digital samples of audio until a target number have been accumulated. This collection of sequential audio samples is defined as a frame. This frame of audio is then passed to, in this instance, the non-visual cue detection algorithm.

In this embodiment these frames of audio samples are cached, such that they can be processed in sequential blocks. By analogy, audio buffers act as a processing queue, allowing a frame-based algorithm to manipulate these blocks of audio data at a speed that is slightly de-correlated from the rate it is captured. However, due to a windowing process downstream of audio buffering, non-overlapping frames suffer from an under-representation of the audio signal. Without the overlap some of the received data may be missed or not processed. Overlapped frame-based processing is generally understood by one of ordinary skill in the art and as a result is not discussed in great detail herein.

Figure 10A:
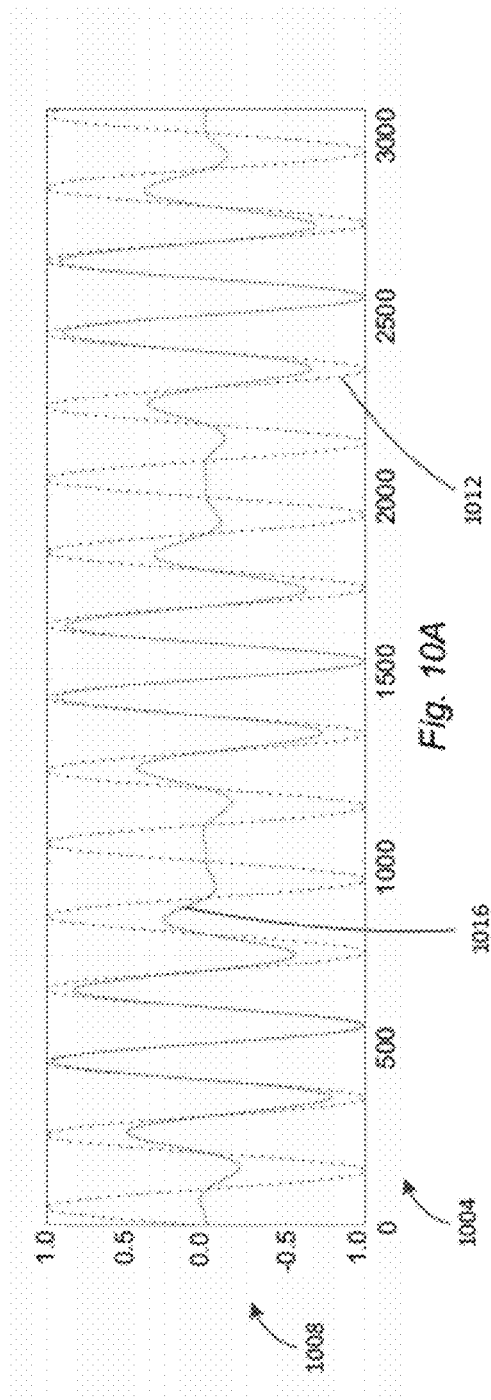
FIG. 10A illustrates a signal plot that does not have overlapping frames of audio.
Figure 10B:
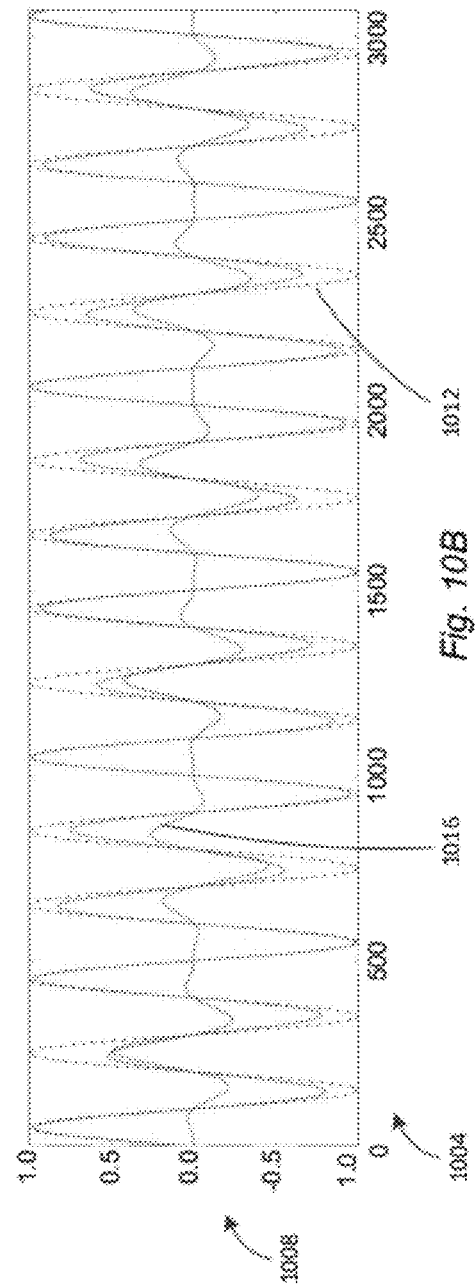
FIG. 10B illustrates a signal plot that does have overlapping frames of audio.

FIG. 10A illustrates a signal plot that does not have overlapping frames of audio. FIG. 10B illustrates a signal plot that does have overlapping frames of audio. On both figures, the horizontal axis 1004 represents time or a linear progression of data while the vertical axis represents amplitude or a representation of amplitude such as signal level RMS or a unit magnitude in the digital domain. Plots 1016 shown with a solid line each represent different windowed signals as created or established by the algorithm. Dashed plot 1012 represents the original signal. As can be seen in these figures, these plots provide a visualization of how attenuation of the signal occurs periodically if the system does not perform an overlap process. A sinusoidal signal 1012 (dashed) is shown with windowed plots 1016 superimposed on plot 1012. When adjacent, the point wide multiplication is performed the resulting a magnitude of interest and zeroed out when the overlapped, windowed frames are summed together, the original signal can be recovered exactly. Further more, this process can be extended to illustrate how an overlap percentage greater than half gives an algorithm an overcomplete representation of the full time-domain signal.

In the case of non-overlapping frames, the algorithm described herein is able to process a small percentage of the actual signal content. In the method described herein, which utilizes overlapping frames, this overlap parameter is set to 80%, providing a partially redundant view or sampling of the captured audio signal. This redundant view of sampling provides the benefit of increased accuracy as compared to prior art embodiments.

In this embodiment the audio frames are returned by the operating system using the remoteIO callback function that is part of the software operating system or the application. This functionality is provided as part of the iOS operating system developed by Apple Inc but in other embodiments other routines or functions may be used when implemented on different operating systems. In general, the method described herein utilizes the operating system to provide the incoming audio data to the non-visual cue detection routine. In this embodiment these audio frames are stored in a data structure (array) three (3) times the length of each returned frame. In other embodiments different numbers or sizes of data structures may be used. This arrangement is defined as a triple buffer scheme. This is preferred due to the overlapping nature of frames processed by the algorithm, where it may be necessary to write data from the operating system in part of the buffer that is guaranteed not to conflict with the region being accessed by the algorithm.

FIG. 11 illustrates the triple buffering arrangement. In other embodiments, different buffering arrangements may be provided. As shown in FIG. 11, three frames are defined as Frame A, Frame B, and Frame C. By using three different buffers to temporarily store the frames during processing, access conflicts are prevented. For example in the event Frame A is being written to memory, then Frames B and C, or a portion thereof may be read from memory. The three different buffers separately contain the frames to avoid conflicts.

This approach also offers the added benefit of corresponding to or being related to the rate at which non-visual cues or symbols are embedded or encoded in source audio, such that, in this down-sampled representation each symbol has an "on" duration of five (5) frames and an "off" duration of five (5) frames. This processing routine parameterizes the frame length and window size and downsamples the signal to a lower data rate. In this embodiment, the encoding of the non-visual dues is such that the non-visual cues are on or transmitted for 5 frames and off for 5 frames. Detection is matched to the encoding scheme and hence the decoder is clocked to match the encoding scheme. This relationship addressed further below in section entitled Synchronous Symbol Recovery. The relationship between a symbol's duration in frames is a direct function of the frame overlap percentage.

In summary, the incoming audio signal is buffered in a data structure at least three times the length of the data received from the operating system's audio callback function. In other embodiments, different lengths or sizes of buffering may occur. The frames are read from memory to be processed by the detection algorithm and are overlapped at a rate of 80% to improve accuracy. For an exemplary sample rate of 44.1 kHz and a frame size of 3308 (explained in greater details in the following section), this results in a frame rate of approximately 66.6 Hz.

Tuned Harmonic Analysis

Performing tuned harmonic analysis is done to determine the frequency components of the received audio signal. In one embodiment, the tuned harmonic analysis is performed to determine or quantify the strengths of the frequencies which are being detected or attempted to be detected. In this embodiment frames of audio samples are received by the harmonic analysis unit for harmonic analysis to quantify the amplitude, or strength, of specific frequencies used for broadcasting non-visual cues. Stated another way, the harmonic analysis identifies the spectral content (frequencies that comprise the audio signal) with exclusive focus on the frequencies at which non-visual cues are encoded in the audio signal.

FIG. 12 illustrate an exemplary block diagram of the harmonic analysis unit 920 comprises a windowing function module 1204 which in turn feeds into a tuned discrete Fourier transform (DFT) unit 1208. The output of the DFT feeds into X value and Y value registers 1212, 1216 which may comprise memory locations. In this example embodiment the window function 1204 works in unison with the tuned DFT operation as described below to generate the X values and Y values.

Arbitrary transforms can be designed to characterize signal components befitting a given application. In one embodiment the discrete Fourier transform (DFT), is adopted for use. The DFT is a signal processing manipulation that may be implemented with a set of orthogonal basis vectors defined by a set of digital frequencies which allow the operation to be inverted. The following sets forth the DFT equation 1:

$$X_k = \sum_{n=0}^{N-1} x_n \cdot \exp^{-i2\pi \frac{k}{N} n}$$

and equation 2:

$$X_k = \sum_{n=0}^{N-1} w_n \cdot x_n \cdot \exp^{-i2\frac{2f_k}{f_s} n}$$

$$f_k \in [f_0, f_1 \ldots f_6]$$

For this discussion the projection into the Fourier domain is for the purposes of explanation, invertibility constraints on the method are relaxed or not discussed herein, and as a result the frequencies of the transform's basis vectors can be tuned to a given application, such as the encoding scheme of the non-visual cues. In this embodiment the basis vectors comprise complex sinusoids. For example the received audio signal/data may be presented to a filter bank or other elements configured to isolate signals at particular frequencies. These filter banks or other elements may be provided with basis vectors which are tuned or selected to have complex and real cosines and/or sine signals that are tuned to the frequencies at which the non-visual cues were encoded.

In this embodiment, the set of basis vectors used for the DFT are tuned to match the seven (7) frequencies selected for the symbols which represent the non-visual cues, defined in equation 2 above. In this example the set of frequencies fk correspond to the set of non-visual cue frequencies, where the frame size itself is tuned to match the duration of a symbol, such as 0.075 seconds, or 3308 samples at a sampling rate of 44100 Hz. In other embodiments, the duration of symbols and other parameters may be selected to have different values.

Furthermore, calculating the relative magnitude of non-visual cue frequencies was found to be functionally unnecessary, as out-of band frequencies are not directly informative when inferring which non-visual cue symbol may be occurring at a given instant.

In this example embodiment a window function, wk, is also applied in the process. In this implementation, the window function used is the common Hanning window, the effect of which can be seen in the plots of FIG. 10. In general, the window function comprises a mathematical function that is zero-valued outside of some chosen interval. A function that is constant inside the interval and zero elsewhere is called a rectangular window, which describes the shape of its graphical representation. When another function or a signal (data) is multiplied by a window function, the product is also zero-valued outside the interval and as a result all that is left is the part where they overlap and the window function is a non-zero value.

After calculating the Fourier transform of these seven basis vectors the magnitude of the result is taken and separated according to the three (3) rows (referred to as Y) and four (4) columns (referred to as X) of the DTMF matrix. In other embodiments a different number of basis vectors may be used. FIG. 13 illustrates an exemplary matrix showing rows, columns and matrix values. The DFT function is invertible so it is preferred to linearly space the frequencies but in this environment of use the focus is on analysis of the results and not further processing or synthesis of the DFT output. As a result, the focus is on the frequencies at which it is known that non-visual cues are encoded. In this embodiment, there are seven frequencies of interest. Distinguishing between these two subsets (Y and X values) is done to accurately infer the most likely X-Y index pair, where each is treated as a probability distribution.

In summary, in this example embodiment the analysis of the frames are set to be 0.075 seconds in duration, or 3308 samples at a sampling rate of 44100 Hz, matching the "on" duration of an non-visual cue tone. Although other values may be utilized, seven (7) basis vectors are pre-computed for calculating a tuned-DFT operation, matching the frequencies used for non-visual cue transmission. Pre-computing comprises, as part of the initialization of the algorithm, calculating and storing in the memory the filter coefficients or basis vectors used to identify the frequencies of interest such as the frequencies at which the non-visual cues are imbedded in the audio signal. As a result, the filter coefficients or basis vectors may be stored in memory an accessed or retrieved as part of a look up process instead of being re-calculated every cycle. Column (X, a vector of length 4) and row (Y, a vector of length 3) frequency amplitudes are separated as distinct vectors and treated as probability distributions. The probability distribution may comprise the probability that any one cue or frequency is present or occurring at any point in time. These instantaneous estimates of X and Y are then passed on to the next processing stage as shown in FIG. 14.

Synchronous Symbol Recovery

Following harmonic analysis, frequency observations are translated to characters by way of the process shown in FIG. 14. As shown in FIG. 14, the synchronous symbol recovery unit 924 comprises the X buffer 1212 and the Y buffer 1216. These buffers 1212 and 1216 may comprise circular buffers or any other type storage element or memory capable as functioning as described herein. These buffers connect respectively to a clock mask 1404X and 1404Y as shown or the output of the buffers feed into a clock mask operation. In one embodiment, the clock mask 1404 comprises a signal or coefficients that represent a square wave or groups of logic zero values followed by a group of logic one values. This signal or these values are used to do point wise multiplication on the signal to impose the time constrains.

The output of the clock mask 1404 is processed by a symbol max unit 1408X and 1408Y. The symbol max units 1408 comprise software, hardware, or a combination of both that identifies the maximum values of the matrix which is stored in a memory. The symbol max units 1408 may process the data in the matrix to determine which symbol is predominate. In one configuration this occurs without comparison to a threshold but instead performs analysis to determine the best or most accurate as compared to all the matrix values or a select group of matrix values. The outputs of the symbol max units 1408 feed into or are processed to form the cue pattern 1412. The cue pattern 1412 may comprise data stored in memory. The cue pattern 1412 comprises a symbol format that is in the same or similar format as the scheme of the symbol. This symbol scheme is discussed above in greater detail.

In operation, the buffers 1212, 1216 contain data defining two probability distributions of four and three values for X and Y, respectively. The buffers 1212, 1216 may comprise or be maintained as parallel circular data buffers, also referred to as delay lines or FIFO stacks (first in, first out), of a length corresponding to the length of a non-visual cue pattern. For example, the current implementation operates at a rate where the duration of each full symbol (on and off) is equal to ten (10) time frames. Because in this embodiment the current cue schema consists of 48 symbols the parallel delay lines are 480 points in length. As new vectors for X and Y are received at this stage, the oldest data is replaced in the buffers 1212, 1216. This may also be referred to as a first in, first out structure.

Using prior knowledge about the cue symbol rate, a clock mask is constructed to superimpose a temporal grid over the X and Y delay lines. An example of the mask established by the temporal grid is shown in FIG. 15. FIG. 15 illustrates a plot of a grid that is superimposed on the delay lines. On this plot, the horizontal axis 1504 represents time or time samples in discrete time while the vertical axis 1508 represents magnitude or logic level, such as max. and min. amplitude. This plot may be defined by Equation 3, shown below, but is not limited to this instance.

$$C_m = \max(|\sin(\pi m f_{symbol}/f_{frame})|^{\nu}, \tau)$$

Then, for each expected symbol in what could be a cue pattern, the most likely frequency is identified over each 10×4 patch in the X delay line, and similarly each 10×3 patch in the Y delay line. Thereafter, each symbol is assigned a confidence value, defined as the ratio of maximum amplitude divided by the average amplitude over that region. The symbol's character is determined based on a look-up operation in a look-up table or other method taken when this confidence exceeds a given threshold. The look-up table relates the frequencies to characters. The threshold is defined as an amplitude threshold, which may be stored in a file or a memory location. If the confidence exceeds the threshold then the system will trust the outcome (consider the outcome accurate) while ignoring outcomes below the threshold. Otherwise the character is replaced by a termination character ('R'). In this manner, when a non-visual cue is optimally aligned with the clock mask, each symbol should produce larger maxima or magnitude than when the signal is misaligned. By monitoring these maxima the most likely characters are determined.

For each maximum defined as Xi and Yj, the corresponding symbol is retrieved from the DTMF character table (FIG. 13) at index (i,j). After the most likely character is inferred for each symbol position, the character sequence (pattern) is passed on for further processing by subsequent routines (software modules or steps), such as the next stage, which is the latching and de-bouncing stage.

In summary, the Circular buffers cache previous X and Y values equal to the length of a full non-visual cue. A clock is superimposed on the X and Y buffers thereby separating each discrete symbol. For each separated symbol, the most likely frequencies Xi and Yj are identified and used to index into a DTMF character table to determine the DTMF values from the DTMF character table. These characters are concatenated and passed on as a single sequence. Symbol sensitivity is controlled by a threshold parameter, and confidence values for a symbol that fall below this threshold are represented by "R" characters.

Non-Visual Cue Sequence De-Bouncing

During development and as part of the inventive process, it became apparent that the optimal non-visual cue detection strategy is less focused on discarding signal level information and more focused on intelligent interpretation of the decoded non-visual cue strings. Being that the parsing of every frame as described above results in a possible identification of a non-visual cue pattern, it is necessary to reduce the number of possible detections or be able to discard/ignore certain detections. This process may be referred to as de-bouncing, or latching. To perform de-bouncing a logic structure is implemented to accumulate the best non-visual cue patterns received until sufficiently convinced that the observation period has ended. In one embodiment the best non-visual cue pattern is based on a scoring function that is heuristic in nature and defined below in greater detail. This scoring process may occur or be performed using hardware, such as logic or an ASIC, using software code, or a combination of these two systems.

One example implementation of this latching process is described by the pseudo code shown below.

```
set initial values, best score <- minimum score
while True:
    s <- this pattern's score
    if enough time has passed since last mKue and s > best score:
        cache pattern, s -> best score
        start pattern timer, alignment timer
    else if pattern timer is not expired:
        cache pattern, s
    else if alignment time is expired:
        resolve cached patterns
        reset initial values
```

In general, this subroutine performs or embodies a logic structure or software code that is always receiving data, some of which is good or accurate data, over a period of time. This subroutine collects the data by waiting until it has enough good or accurate data before outputting an output based on the entire collection of data. In one configuration, this serves as a latching process that is a collect and hold operation or a collect, hold, and select operation. Inherent to the de-bouncing process is the preferred capability to score non-visual cue patterns across a variety of criteria. This facilitates distinguishing well-formed non-visual cues from corrupted patterns or simply noise.

In one embodiment distinguishing well-formed non-visual cues from corrupted patterns or simply noise is achieved by computing a weighted score, where a character sequence receives or loses points based on how well it matches the expected non-visual cue schema. Specifically, in one embodiment the character sequence is evaluated for matches along the following dimensions or parts of the sequence: Known characters (F/R), Header/footer, Payload integrity, and Payload redundancy.

The scoring scheme or process can be achieved in several ways. One exemplary method assigns a single point (+1) for every correct known character, plus/minus four (±4) points for a correct/incorrect header or footer, minus three (−3) points for any terminator character in the payload, and plus twenty (+20) for a redundant payload. For clarity, in this embodiment the payload refers to the desired five (5) digit non-visual cue number sequence. Scores may also be normalized, but this primarily serves to encourage agnostic programmatic elements that may use or incorporate such values, in the event that the scoring paradigm changes in the future. Hence, if the cues or cue encoding method changes, then the scoring methodology may likewise be modified.

In summary, the non-visual cue patterns are filtered by fitness scores as defined above. For example, for a string of detected non-visual cues each string is assigned a fitness score. Based on these fitness scores the best match or best string is determined. The best string or data may not always be the string or data with the highest score, but other factors may also be considered such as the accuracy of select cue matches within the string. The non-visual cue patterns with the best score or other criteria over a time range trigger the resolution of a set of cached non-visual cue character sequences. Hence, in one embodiment using a look-up table, when a string meets or passes a score or threshold the string is converted to symbols and then evaluate based on how well symbols meet expectations. These expectations may include the heuristic scoring algorithm described previously. The non-visual cue character sequence is scored according to the expected format, where points are earned or lost according to the integrity of various features, with the possible highest score normalized to one (1).

Non-Visual Cue Parsing & Final Scoring

Once a non-visual cue detection event is triggered, a set of possible non-visual cue patterns and their corresponding scores are passed to a software routine capable of resolving these character sequences. A detection event comprises the detection, during the latching or when catching and holding of data, the evaluation of a string resulting in the passing to the next processing routine, the best or highest scoring string, or more than one string in a weighted order. In the embodiment disclosed herein, all strings are forwarded to the next processing routine, but the strings are ordered or arranged in weighted order based on the fitness score.

The parsing and final scoring may be considered as a voting process or vote calculation process to determine the most likely non-visual cue. In this example embodiment valid non-visual cues are extracted from each pattern sequence and then paired with the associated score, and the observations or scores are tallied. After parsing each pattern, a single data structure is created that comprises valid non-visual cues and their scores, sorted by decreasing occurrence. As used herein, the term parse means or includes the sorting and the extraction of the payload (which may comprise the product code for the product on TV) for the sequence. The score(s) represent likelihoods that the suspected non-visual cues are valid non-visual cues. Therefore, the most likely non-visual cue is the first in the structure, but not necessarily the highest scoring. Thus the ranking may be based on score or based on occurrence of the detected code. Other criteria for arranging the non-visual cues are contemplated. This single object is then returned to its parent delegate (requesting software routine or element) for subsequent handling. The subsequent handling comprises further processing by the main subroutine or subsequent element. The object comprises a data structure or one or more items of data. In one embodiment the object comprises the detected non-visual cues. This concludes the non-visual cue detection process.

In summary, the non-visual cue are extracted from a set of patterns, and sorted in descending order of occurrence count. As a result, a single data structure is returned to the MD application or other software subroutine that is part of the MD application, comprised of five (5) digit non-visual cues. The cues comprise 5 digits due to the nature of the cue structure and the encoding process. Hence, each payload is 5 digits. In other embodiments the cues may be other than 5 digits. The scores are normalized to values between or within the range of [0,1].

This method is but one possible method operation and associated system for performing this method. One of ordinary skill in the art may arrive at different embodiments which do not depart from this disclosure and the claims that follow.

Figure 16:
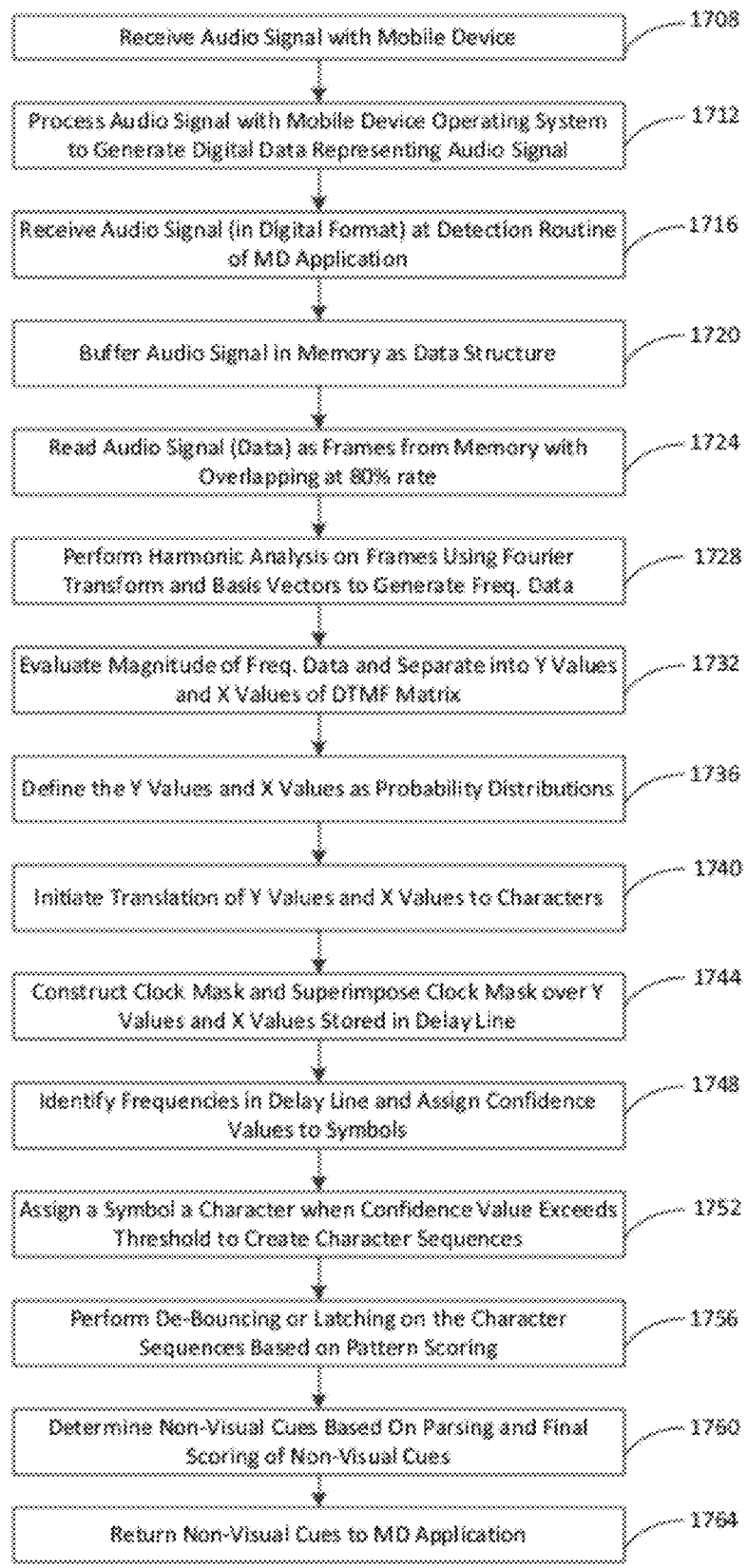
FIG. 16 provides a flow diagram of an example method of operation for detecting and decoding non-visual cue data embedded into audio signals.

FIG. 16 provides a flow diagram of an example method of operation for detecting and decoding non-visual cue data embedded into audio signals. This is but one possible method of operation and other methods or processes may be performed which do not depart from the Claims that follow. This operation begins at a step 1708 when an audio signal is received with a mobile device. It is contemplated that the audio signal contains embedded non-visual cues as described above. Then at a step 1712 the mobile device operating system in connection with one or more hardware or software elements processes the audio signal to convert its format to a digital format. Thereafter the audio signal is in a digital format.

At a step 1716 the detection routine, which is part of the MD application, receives the audio signal (in a digital format) for processing. Then, at a step 1720 detection routine buffers the audio signal in memory as a data structure. In one configuration the buffer or buffering is three times the length of the frames formed from the audio data. At a step 1724 the audio signal, formed into overlapping frames, is read from the memory. In this embodiment the overlap rate is 80% but in other embodiments other overlap rates may be established. Then, as a step 1728 the detection routine performs harmonic analysis on the frames using a Fourier transform or any other suitable algorithm. Basis vectors tailored to the coding pattern are also used with the Fourier transform to generate frequency data.

At a step 1732 the detection routine evaluates the magnitude of the frequency data and separates the frequency data into Y values and X values based on a DTMF matrix. Then, at a step 1736 the detection routine defines the Y values and X values as probability distribution. Based on these probability distributions, at a step 1740 the probability distributions are translated into characters. The translation is initiated at step 1744 by constructing a clock mask and superimposing the clock mask over the Y values and X values, which in this embodiment are stored in a delay line. Based on this superimposing, the most likely frequencies are identified for each discrete symbol and relative confidence intervals are computed for each. This occurs at a step 1748.

Then at a step 1752 the detection routine assigns a symbol or a character value when a confidence value for that symbol exceeds or meets a threshold to create character sequences. Thereafter, at a step 1756 the detection routine performs de-bouncing or latching on the character sequences base on pattern scoring or some other scoring scheme to determine the score of the possible non-visual cues. Numerous different scoring factors or criteria may be used. Then, at a step 1760 the detection routine determines the non-visual cue(s) to be output based on parsing and final scoring of the possible non-visual cues. Then at a step 1764 the detection routine returns the detected non-visual cues to the MD application. This method is but one possible method operation and associated system for performing this method. One of ordinary skill in the art may arrive at different embodiments which do not depart from this disclosure and the claims that follow.

While this invention has been described in conjunction with the specific embodiments outlined above, it is evident that many alternatives, modifications and variations may be apparent to those skilled in the art. Accordingly, the preferred embodiments of the invention, as set forth above, are intended to be illustrative, not limiting. Various changes may be made without departing from the spirit and scope of this invention.

What is claimed is:

1. A method for processing an audio signal to identify cues which define or relate to product information comprising:
    receiving an audio signal using a microphone of a mobile device;
    converting the audio signal to a digital format
    buffering the audio signal after converting to create buffered data;
    performing harmonic analysis on the buffered data to identify signal magnitudes at two or more predetermined frequencies;
    performing synchronous symbol recovery on the signal magnitudes resulting from the harmonic analysis to establish characters
    performing pattern de-bouncing on the characters based on comparison to one or more predetermined criteria to establish weighted character;
    performing pattern parsing and final scoring on the weighted characters to create a data structure with scored cues.

2. The method of claim 1 wherein the predetermined frequencies comprise frequencies at which cues are known to be located in the audio signal.

3. The method of claim 1 wherein the harmonic analysis comprises one or more tuned variant of the Fourier transform.

4. The method of claim 1 wherein the predetermined criteria used during pattern de-bouncing comprises one or more of the following factors: known characters (F/R), header/footer, payload integrity, and payload redundancy.

5. The method of claim 1 wherein synchronous symbol recovery further comprises assigning a confidence value to the characters.

6. The method of claim 1 wherein the audio signal comprises the audio signal from a television program.

7. The method of claim 1, wherein the cue identifies a product or service.

8. The method of claim 1, wherein the method utilizes a display configured to display product information received from the remote database.

9. The method of claim 1, wherein the method utilizes memory storing non-transitory machine readable code configured to enable the person to purchase the product identified by the cue.

10. The method of claim 1, wherein the cue is at a frequency above 15 kilohertz.

* * * * *